US011327997B2

(12) United States Patent
Talbot et al.

(10) Patent No.: US 11,327,997 B2
(45) Date of Patent: *May 10, 2022

(54) NESTED SORTING OF DATA MARKS IN DATA VISUALIZATIONS

(71) Applicant: Tableau Software, Inc., Seattle, WA (US)

(72) Inventors: Justin Talbot, Seattle, WA (US);
Daniel Cory, Seattle, WA (US);
Jeannine Frazier Boone, Kenmore, WA (US); Ian A. Coe, Seattle, WA (US)

(73) Assignee: TABLEAU SOFTWARE, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/061,504

(22) Filed: Oct. 1, 2020

(65) Prior Publication Data
US 2021/0019329 A1 Jan. 21, 2021

Related U.S. Application Data

(63) Continuation of application No. 15/948,966, filed on Apr. 9, 2018, now Pat. No. 10,795,908.
(Continued)

(51) Int. Cl.
G06F 16/00 (2019.01)
G06F 16/26 (2019.01)
(Continued)

(52) U.S. Cl.
CPC ............ G06F 16/26 (2019.01); G06F 16/252 (2019.01); G06F 16/278 (2019.01); G06F 16/9024 (2019.01)

(58) Field of Classification Search
CPC ...... G06F 16/26; G06F 16/252; G06F 16/278; G06F 16/9024
(Continued)

(56) References Cited

U.S. PATENT DOCUMENTS 7,788,257 B2   8/2010 Kihneman et al.
7,800,613 B2 * 9/2010 Hanrahan ............ G06T 11/206
                                                 345/440

(Continued)

OTHER PUBLICATIONS

Talbot, Preinterview First Office Action, U.S. Appl. No. 15/948,966, dated Dec. 11, 2019, 5 pgs.
(Continued)

Primary Examiner — Thanh-Ha Dang
(74) Attorney, Agent, or Firm — Morgan, Lewis & Bockius LLP

(57) ABSTRACT

An exemplary method receives user actions to (i) associate a first field with a first shelf and (ii) associate second and third fields with a second shelf. The second field is positioned at an outer-most position on the second shelf and the third field is positioned at an inner-most position on the second shelf. The method receives an additional user action to specify a nested sort according to data for the first and third fields. The method generates and displays a data visualization in accordance with the received actions, including: (i) partitioning retrieved data into groups of tuples, each tuple including data for the fields, and each group of tuples corresponding to a distinct value of the second field, (ii) forming panes, each pane corresponding to a respective group of tuples, and (iii) within each pane, displaying data marks, each data mark corresponding to a respective tuple.

20 Claims, 20 Drawing Sheets

Related U.S. Application Data

(60) Provisional application No. 62/569,997, filed on Oct. 9, 2017.

(51) Int. Cl.
*G06F 16/25* (2019.01)
*G06F 16/27* (2019.01)
*G06F 16/901* (2019.01)

(58) Field of Classification Search
USPC .......................................................... 707/798
See application file for complete search history.

(56) References Cited

U.S. PATENT DOCUMENTS

| | | | |
|---|---|---|---|
| 8,583,631 B1 | 11/2013 | Ganapathi et al. | |
| 9,779,150 B1 | 10/2017 | Sherman et al. | |
| 10,437,847 B1* | 10/2019 | Silberstein | G06F 16/26 |
| 10,733,198 B1* | 8/2020 | Marschner | G06F 16/252 |
| 10,795,908 B1* | 10/2020 | Talbot | G06F 16/9024 |
| 11,151,137 B2* | 10/2021 | Bhattacharjee | G06F 16/278 |
| 2004/0199530 A1 | 10/2004 | Avadhanam et al. | |
| 2004/0243593 A1* | 12/2004 | Stolte | G06F 16/212 |
| 2005/0060300 A1 | 3/2005 | Stolte et al. | |
| 2005/0091181 A1* | 4/2005 | McKee | G06F 16/26 |
| 2005/0091667 A1 | 4/2005 | McKee et al. | |
| 2008/0046403 A1* | 2/2008 | Kihneman | G06F 16/345 |
| 2008/0091698 A1 | 4/2008 | Cook et al. | |
| 2010/0005113 A1 | 1/2010 | Hu et al. | |
| 2011/0078216 A1 | 3/2011 | Healy et al. | |
| 2013/0246484 A1* | 9/2013 | Stolte | G06F 16/248 707/807 |
| 2015/0081692 A1* | 3/2015 | Mackinlay | G06Q 40/025 707/733 |
| 2017/0177678 A1* | 6/2017 | Stolte | G06F 16/2282 |
| 2019/0050480 A1 | 2/2019 | Courter | |

OTHER PUBLICATIONS

Talbot, First Action Interview Office Action, U.S. Appl. No. 15/948,966, dated Feb. 25, 2020, 6 pgs.

Talbot, Notice of Allowance, U.S. Appl. No. 15/948,966, dated Jun. 17, 2020, 22 pgs.

Parasuraman, May 2000, A Model for Types and Levels of Human Interaction with Automation, vol. 30, No. 3, 286-287, and 294 (Year: 2000), 12 pgs.

Wesley, Office Action, U.S. Appl. No. 16/218,283, dated May 11, 2021, 67 pgs.

Wesley, Notice of Allowance, U.S. Appl. No. 16/218,283, dated Sep. 8, 2021, 21 pgs.

* cited by examiner

NESTED SORTING OF DATA MARKS IN DATA VISUALIZATIONS

RELATED APPLICATIONS

This application is a continuation of U.S. application Ser. No. 15/948,966, filed Apr. 9, 2018, entitled "Nested Sorting of Data Marks in Data Visualizations," which claims priority to U.S. Provisional Application No. 62/569,997, filed Oct. 9, 2017, entitled Nested Sorting Of Data Marks In Data Visualizations," each of which is incorporated by reference herein in its entirety.

TECHNICAL FIELD

The disclosed implementations relate generally to data visualization and more specifically to systems, methods, and user interfaces that provide greater flexibility for sorting data marks in data visualizations.

BACKGROUND

Data visualization applications enable a user to understand a dataset visually, including distribution, trends, outliers, and other factors that are important to making business decisions. Some datasets are very large or complex, and include many data fields. Various tools can be used to help understand and analyze the data, including tools that sort data displayed in data visualization applications (e.g., sort data displayed in a table, a chart, or a graph). Sorting data within data visualization applications helps users understand and appreciate nuances of their data. For example, a person may apply various sort operations to a data visualization to determine whether a sector of its business is more (or less) profitable than expected. Current approaches to sorting, however, often do not match user expectations. For example, current approaches to sorting fail to sort data marks at differing levels of granularity. Because of this, users are sometimes required to take unintuitive steps in order to achieve a desired outcome.

SUMMARY

Accordingly, there is a need for systems and methods for sorting data marks for complex hierarchical data. One solution to the problem is providing a nested sort operation that sorts data marks within groups independently of other groups within the same data visualization. Such systems and methods allow a user to sort data marks at differing levels of granularity. As will be explained in greater detail below, the nested sort operation allows for data marks within different panes of a data visualization to be independently ordered.

Data fields are made from the columns in a data source (e.g., a relational database, a spreadsheet, a CSV file, or a JSON file). Each field has a data type (such as integer, string, or date), and a data role: dimension or measure. Dimensions contain qualitative values (such as names, dates, or geographical data). A dimension is used to categorize, segment, and reveal the details in the data. Dimensions affect the level of detail in the view. On the other hand, measures contain numeric, quantitative values that can be measured. A user can apply calculations to measures and aggregate them (e.g., compute a sum). When a measure is placed on a shelf, a default aggregation is applied to that measure (e.g., placing Profit onto a shelf becomes SUM(Profit) by default).

The terms "dimension" and "measure" will be used throughout the disclosure, and are used as just described. Commonly, measures are continuous numeric fields and dimensions are strings or dates (or portions thereof, such as year or month).

In accordance with some implementations, a method is performed at a computer having a display, one or more processors, and memory storing one or more programs configured for execution by the one or more processors. The method displays a user interface on the display. The user interface includes (i) a schema information region containing a plurality of data fields and (ii) a data visualization region having a plurality of shelves. The method receives user actions to (i) associate a first data field of the plurality of data fields with a first shelf of the plurality of shelves and (ii) associate a second data field and a third data field of the plurality of data fields with a second shelf of the plurality of shelves. The second data field is positioned at an outer-most position on the second shelf and the third data field is positioned at an inner-most position on the second shelf. The method receives, via an affordance displayed in the data visualization region, an additional user action to specify a nested sort operation according to data for the first data field and the third data field.

In response to the additional user action, the method generates and displays a first data visualization in the data visualization region in accordance with the user actions and the additional user action. The response includes (i) partitioning retrieved data into groups of tuples, each tuple including data for the first, second, and third data fields. Each group of tuples corresponds to a respective distinct value of the second data field. The response also includes (ii) forming a plurality of panes, each pane corresponding to a respective group of tuples, and (iii) within each pane, displaying a respective plurality of data marks, each data mark corresponding to a respective tuple in the respective group of tuples. Each plurality of data marks is displayed in order according to data values for the first data field in the respective tuples.

In some implementations, the first data field is a measure, the third data field is a dimension, and the data for the first data field in each tuple is a respective computed aggregate of the first data field corresponding to the respective data values for the second and third data fields in the respective tuple (i.e., the second and third data fields specify the grouping for the aggregation of the first data field). In this case, each tuple has a unique combination of values for the second and third data fields, and the data for the first data field is an aggregation over all rows from the data source that have the specific combination of values for the second and third data fields.

In some implementations, the method receives a second additional user action to associate a fourth data field of the plurality of data fields with the second shelf, thereby arranging the fourth data field at the inner-most position in the second shelf instead of the third data field. In response to receiving the second additional user action, the method generates and displays a second data visualization in the data visualization region. The response includes (i) repartitioning retrieved data into subgroups of tuples, each tuple including data for the first, second, third, and fourth data fields. Each subgroup of tuples corresponds to a respective distinct combination of values of the second and third data fields. The response also includes (ii) forming a plurality of subpanes, each subpane corresponding to a respective subgroup of tuples, and (iii) within each subpane, displaying a respective plurality of data marks, each data mark corresponding to a respective tuple in the respective subgroup of tuples. Each plurality of data marks (within a pane) is displayed in order according to data values for the first data field in the respective tuples. The order may be specified as ascending or descending.

In some implementations, the method selects a first graph type for the first data visualization according to the data types of the first, second, and third data fields and selects a second graph type for the second data visualization according to data types of the first, second, third, and fourth data fields. In some instances, the second graph type is different from the first graph type.

In some implementations, the method receives a second additional user action to associate a fourth data field of the plurality of data fields with the second shelf. In some instances, the fourth data field is placed at a central position on the second shelf between the second data field and the third data field, thereby leaving the third data field at the inner-most position. In response to receiving the second additional user action, the method generates and displays a second data visualization in the data visualization region. The response includes (i) repartitioning retrieved data into subgroups of tuples, each tuple including data for the first, second, third, and fourth data fields. Each subgroup of tuples corresponds to a respective distinct combination of values of the second and fourth data fields. The response also includes (ii) forming a plurality of subpanes, each subpane corresponding to a respective subgroup of tuples, and (iii) within each subpane, displaying a respective plurality of data marks, each data mark corresponding to a respective tuple in the respective subgroup of tuples. Each plurality of data marks is displayed in order according to data values for the first data field in the respective tuples.

In some implementations, before receiving the additional user action to perform the nested sort operation, the method generates and displays an initial data visualization in the data visualization region. To do this, the method first computes a respective single aggregate value of the first data field for each distinct value of the third data field. This computation is irrespective of the second data field. Generating and displaying the initial data visualization in the data visualization region includes sorting the plurality of data marks in each of the plurality of panes according to the computed aggregate values of the first data field. Note that this initial data visualization is not based on nested sorting. In particular, the same sort order, which is based on all of the data, applies to every one of the panes, and does not necessarily match how marks within a pane would be sorted using only data corresponding to the pane.

In some implementations, the affordance displayed in the data visualization region is displayed in the initial data visualization. In some implementations, the affordance displayed in the data visualization region is displayed in the first data visualization. In some implementations, the affordance is displayed proximate to an axis of the first data visualization (or the initial data visualization).

In some implementations, the method receives a second additional user action to perform a header sort operation that sorts the plurality of panes in a pane sort order. The second additional user action is received via a second (different) affordance displayed in the data visualization region. The second affordance corresponds to the second field and the header sort operation is performed based, at least in part, on data for the second field in each respective tuple of data.

In accordance with some implementations, a computer system includes one or more processors/cores, memory, and one or more programs. The one or more programs are stored in the memory and configured to be executed by the one or more processors/cores. The one or more programs include instructions for performing any of the methods described herein.

In accordance with some implementations, a computer-readable storage medium stores instructions for the one or more programs. When executed by one or more processors/cores of a computer system, these instructions cause the computer system to perform any of the methods described herein.

In accordance with some implementations, the computer system is a smart phone, a tablet computer, a notebook computer, or a desktop computer.

BRIEF DESCRIPTION OF THE DRAWINGS

For a better understanding of the aforementioned systems, methods, and graphical user interfaces, as well as additional systems, methods, and graphical user interfaces that provide nested sorting, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
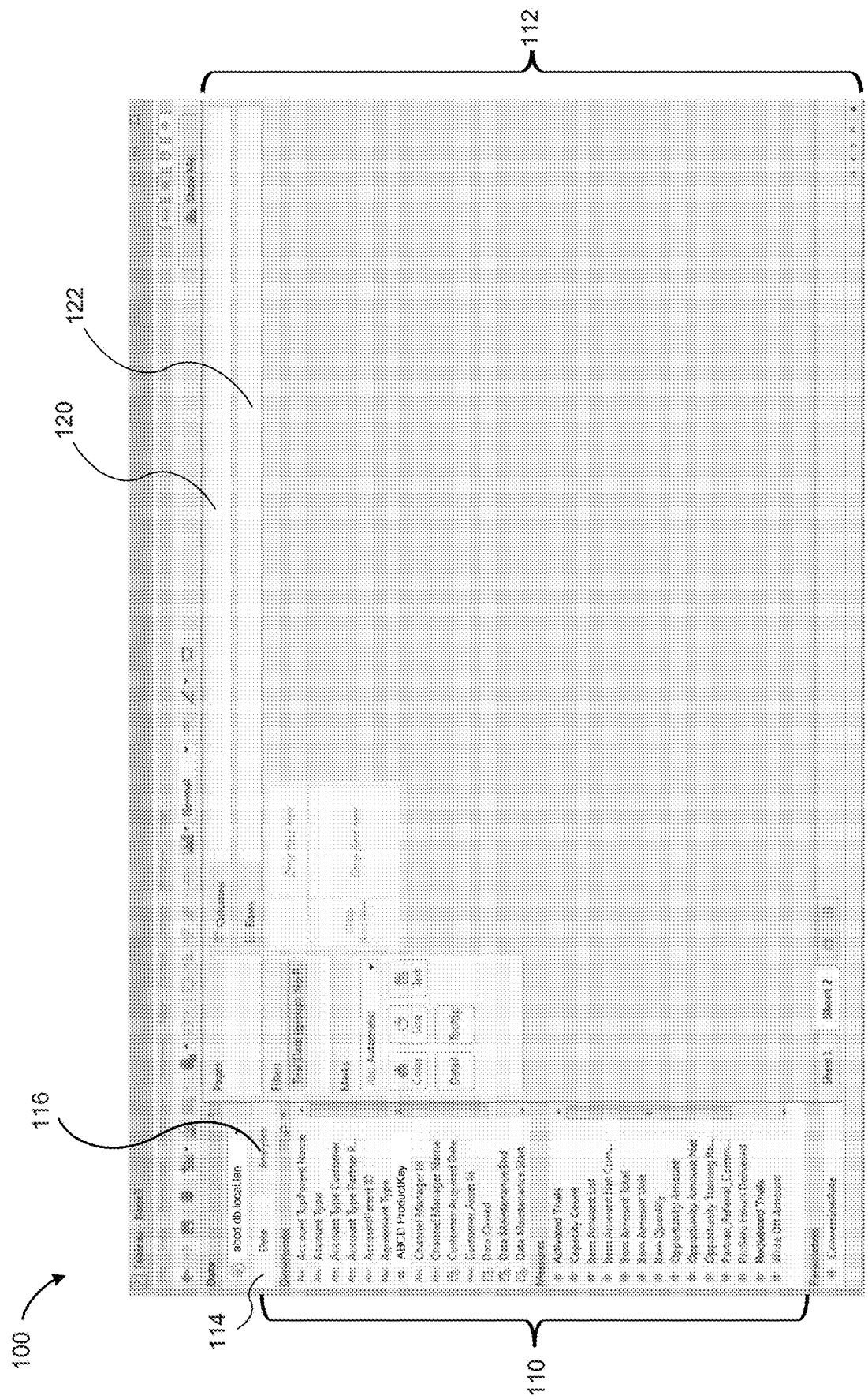
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (also referred to herein as field names, data fields, or fields), which may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the columns shelf 120 and the rows shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets or pages.

Figure 2:
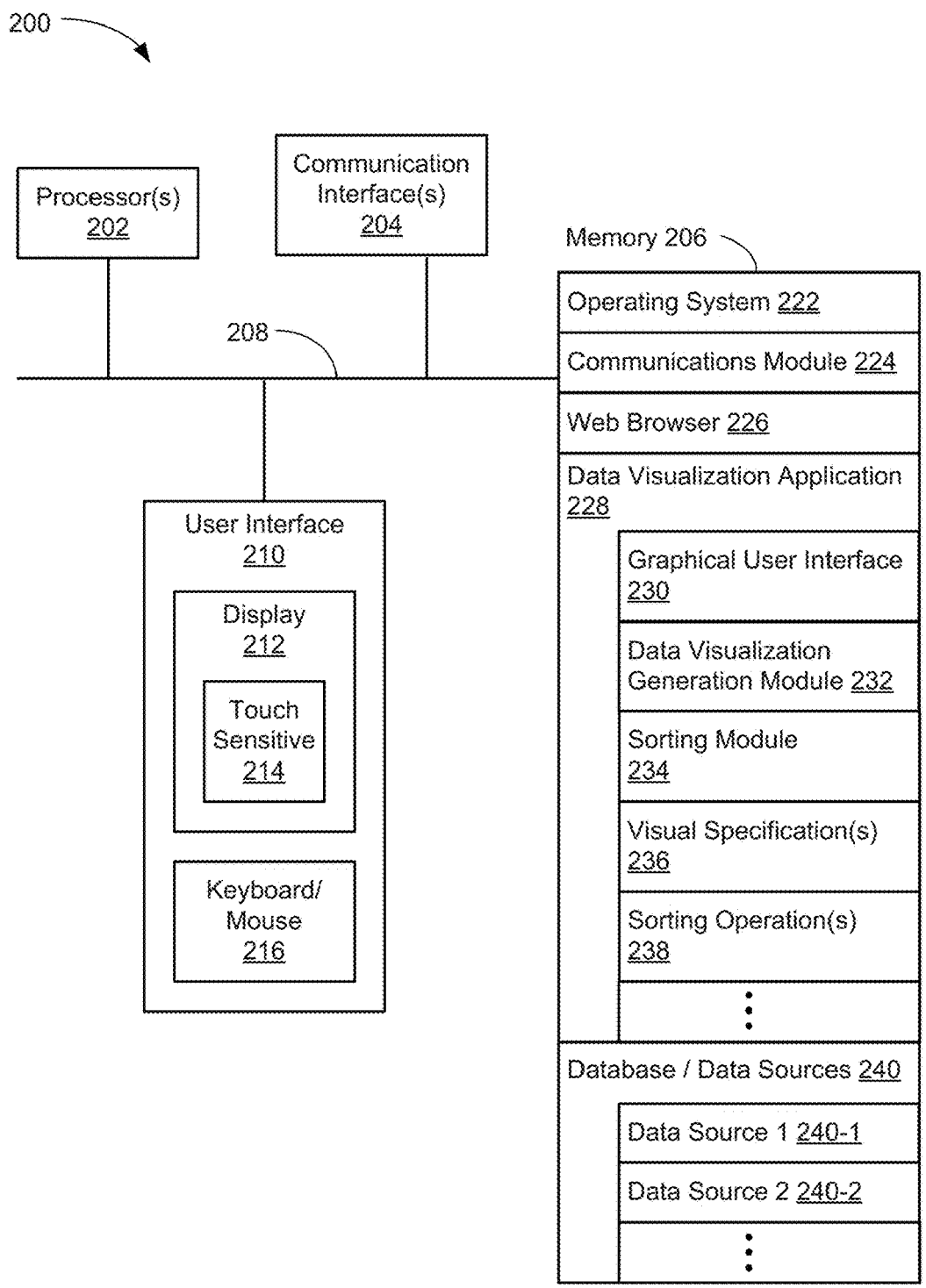
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, a smartphone, and other computing devices that have a display and a processor capable of running a data visualization application 228. The computing device 200 typically includes one or more processing units (processors or cores) 202, one or more network or other communications interfaces 204, memory 206, and one or more communication buses 208 for interconnecting these components. In some implementations, the communication buses 208 include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed).

The memory 206 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternately the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- a data visualization application 228, which is used for data analysis. The application 228 includes a graphical user interface 230 (e.g., the graphical user interface 100 illustrated in FIG. 1) for a user to construct visual graphics. For example, a user selects one or more data sources 240 (which may be stored on the computing device 200 or stored remotely), selects data fields from the data source(s), and uses the selected data fields to define a visual graphic; and
- zero or more databases or data sources 240 (e.g., a first data source 240-1 and a second data source 240-2), which can be used by the data visualization application 228. In some implementations, the data sources 240 are stored as spreadsheet files, CSV files, XML files, or flat files, or stored in a relational database.

In some implementations, the data visualization application 228 includes a data visualization generation module 232, which takes user input (e.g., a visual specification 236), and generates a corresponding visual graphic, such as a data visualization. The data visualization application 228 then displays the generated visual graphic in the user interface 230. In some implementations, the data visualization application 228 executes as a standalone application (e.g., a desktop application). In some implementations, the data visualization application 228 executes within the web browser 226 or another application using web pages provided by a web server (e.g., a server based application).

In some implementations, the data visualization application 228 includes a sorting module 234, which sorts data marks displayed in a visual graphic. For example, the sorting module 234 may define groups or subgroups from tuples of data, and sorts data marks that correspond to those groups and/or subgroups. In some implementations, the sorting module 234 applies one or more sorting operations 238 to sort data marks displayed in the visual graphic. The sorting operations 238 include, for example, alphabetical sorts, legacy sorts, break sorts, and nested sorts. Each of these sort operations is discussed below.

In some implementations, the information the user provides is stored as a visual specification 236. In some implementations, the visual specification 236 includes sorting commands received from a user. In some implementations, the sorting module 234 is used for processing (e.g., interpreting) the received sorting commands provided by the user.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. In some implementations, the memory 206 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
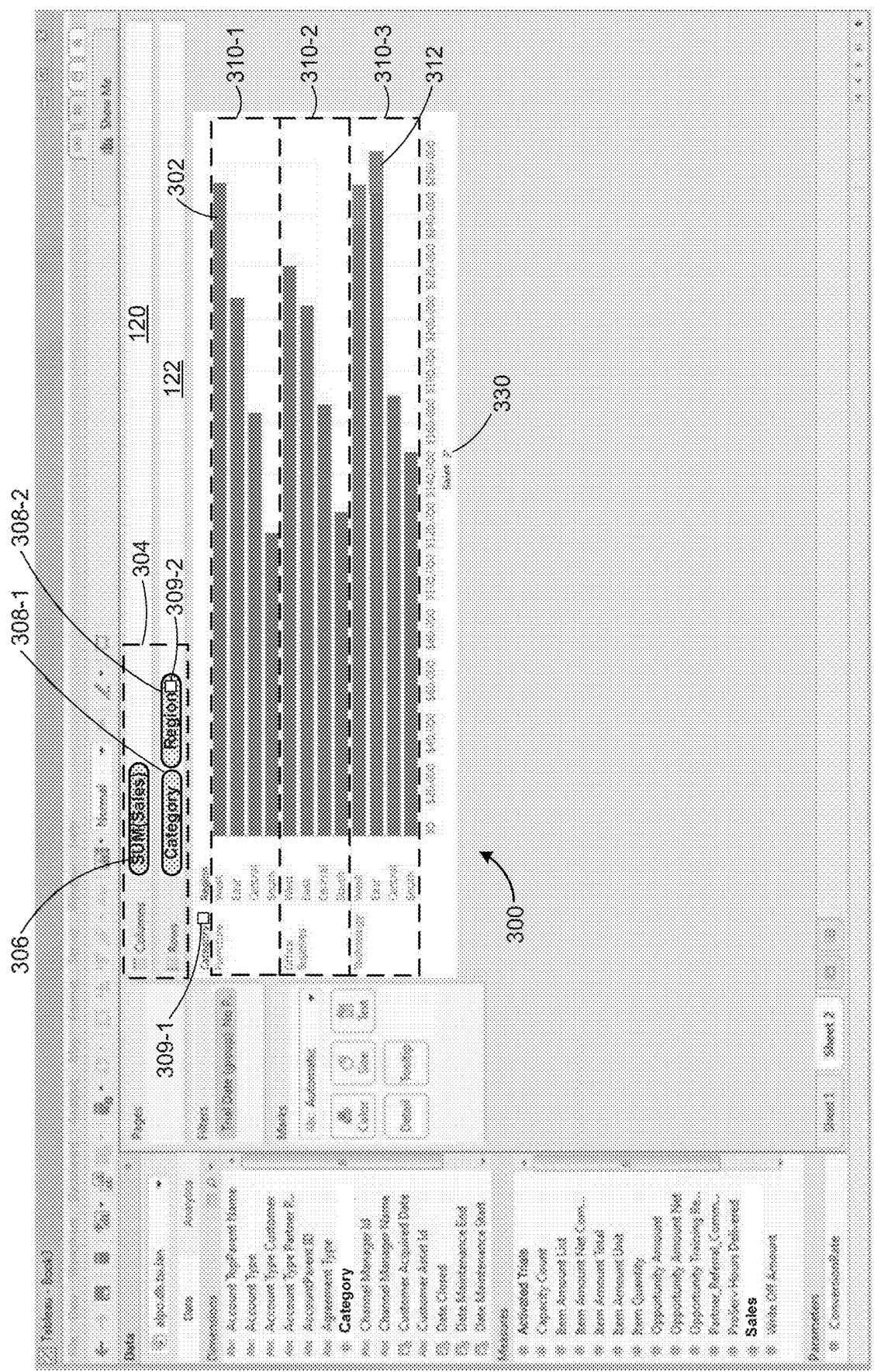
FIG. 3A illustrates a data visualization with data marks sorted according to a non-nested legacy sort.

FIG. 3A illustrates a data visualization 300 with data marks sorted in a default manner (a legacy sort). Specifically, a user has chosen to order the displayed marks by sales within each region. By default, ordering the marks by sales within region determines the sort order without regard to category. The determined order is West, East, Central, and South, and this same order is applied to each of the three categories in the panes 310-1, 310-2, and 310-3. A user, however, may expect to see the marks within each category to be ordered according to just the marks in that category. With this expectation, the data in the top pane 310-1 looks correct, including the highest mark 302 for the West region. However, the data marks in the third pane 310-3 of the data visualization 300 are not sorted in the way the user expects. For example, the second data mark 312 in the third pane 310-3 is bigger than the first data mark in the third pane 310-3. The data visualization 300 has sorted the data according to plan, but there is a mismatch between the behavior and what the user expects. The nested sorting illustrated in FIGS. 4A-4F present various implementations that address this issue.

To create the data visualization 300, a user interacts with shelves (e.g., the columns shelf 120 and the rows shelf 122) in a graphical user interface 100 to specify characteristics of the desired data visualization. In some implementations, the specified characteristics are saved as a visual specification 236. In response to receiving the user selections, the computing device 200 generates and displays the data visualization 300 (e.g., a bar chart), which includes a plurality of data marks. Many other chart types can be displayed, depending on which data fields are selected and the arrangement of those fields within the shelves. Sometimes the term "data field" is abbreviated to "field" when the meaning is clear.

The user selections 304 in FIG. 3A include placement of the Sales field 306 on the columns shelf 120 (which defaults to computing a SUM), placement of the Category field 308-1 on the rows shelf 122, and placement of the Region field 308-2 on the rows shelf 122. According to these selections by the user, the Data Visualization Generation Module 232 creates the horizontal bar chart 300, which is partitioned into three panes 310-1, 310-2, and 310-3. Each of the panes corresponds to a distinct value of the Category field 308-1, which is the outermost field on the rows shelf 122. The first pane 310-1 corresponds to a first distinct value ("Furniture") of the category field 308-1, the second pane 310-2 corresponds to a second distinct value ("Office Supplies") of the category field 308-1, and the third pane 310-3 corresponds to a third distinct value ("Technology") of the category field 308-1. Each pane includes multiple data marks, each mark representing the total sales for a specific (category, region) combination. For example, the first bar 302 in the first pane 310-1 represent the total sales of Furniture in the West region.

In some instances, a user sorts (i.e., orders) the data in the data visualization 300 in one or more ways. One way to sort the data here is to arrange the panes. For example, a user may interact with column affordance 309-1 to order the panes alphabetically (e.g., ascending or descending).

In another example, the user may interact with an affordance (e.g., the pill affordance 309-2) to order the data marks according to data values for the field specified in the pill.

In order instances, a user wants to order the data marks according to an aggregated value, such as SUM(Sales) 306. This can be in either ascending or descending order, and as is sometimes referred to as a legacy sort. The legacy sort sorts the marks on the innermost dimension according to the total aggregation of sales.

As noted above, selection of the legacy sort operation causes the data marks displayed in the data visualization 300 to be sorted according to total sales by region. To accomplish this, the computing device 200 sums up the total sales by region and ranks the total sales by region. For example, the total sales by region results in a ranked list as follows: (1) West, (2) East, (3) Central, and (4) South (i.e., the "West" region has the most total sales). Accordingly, regardless of category, the computing device 200 orders the data marks within each pane according to the ranked list. Thus, data marks within each pane 310 are sorted in the same order (i.e., (1) West, (2) East, (3) Central, and (4) South). Such a result can lead to undesired or unexpected results, such as the second data mark 312 in the third pane 310-3. While the data mark 312 for technology sales in the "East" region is the greatest for sales in the technology category, the overall sales in the "East" region are less than overall sales in the "West" region. According to a legacy sort, the presentation in FIG. 3A is "correct."

The axis sort icon 330 along the sales axis is described below with respect to FIG. 3C. The axis sort icon can be used to create a nested sort using computed aggregate values for the measure on the axis (e.g., Sales).

Figure 3B:
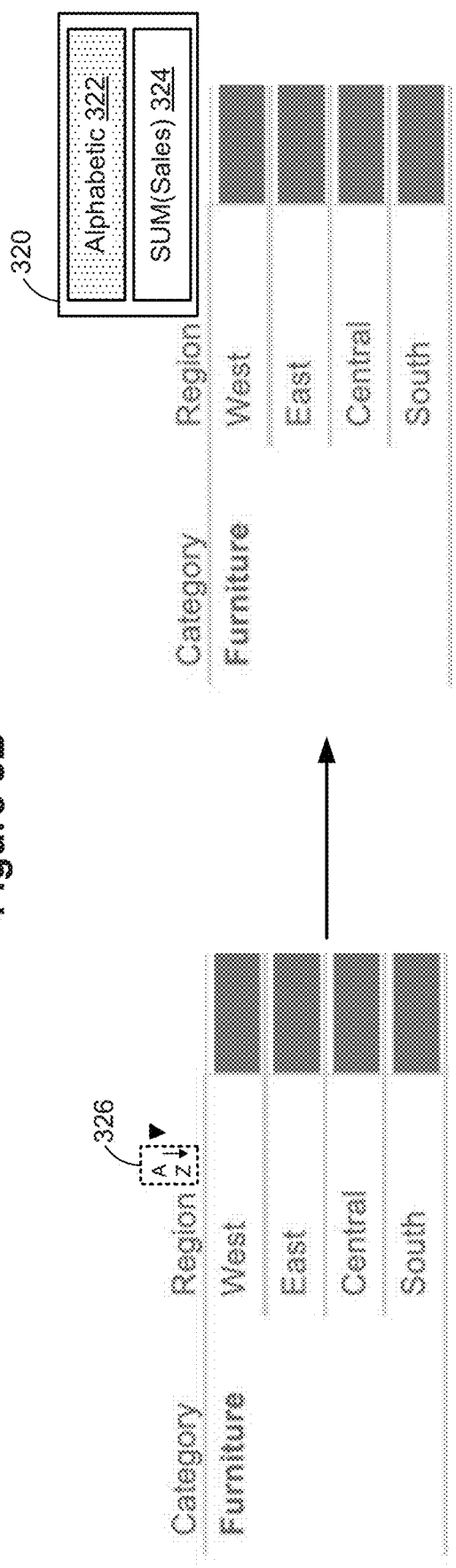
FIG. 3B illustrates interface elements used to perform various sort operations in accordance with some implementations.

FIG. 3B illustrates the use of a header sort icon 326 in accordance with some implementations. The header sort icon 326 can be used to select an alphabetic sort or a legacy sort. For example, a user may select (e.g., left click or touch a touch-sensitive display of the computing device 200) the icon 326, which causes a popup menu 320 to appear. In some implementations, the icon 326 appears only after hovering the cursor in proximity to a column header.

The popup menu 320 includes a plurality of selectable options, including a first option 322 for an alphabetic sort and a second option 324 for a legacy sort operation using sum of sales. In this example, the first option 322 is currently activated, as indicated by shading of the first option 322. The icon 326 indicates which option is currently selected. The icon 326 shows that the alphabetic sort 322 is currently selected, and that the alphabetic sort is going from A to Z.

In some implementations, instead of the popup menu 320 being displayed after user selection of the icon 326, the computing device 200 cycles through the various sort operations in response to user selection of the icon 326. Upon each selection, the computing device 200 updates the data visualization according to the selection. In this way, the computing device 200 quickly displays each of the sort operations to the user, enabling quick selection.

Figure 3C:
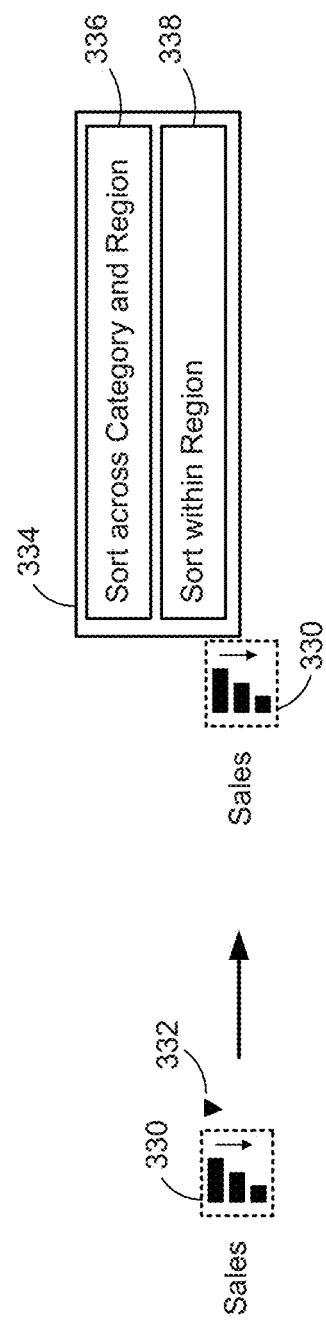
FIG. 3C provides example interface elements used to perform various sort operations in accordance with some implementations.

FIG. 3C illustrates the use of an axis sort icon 330 in accordance with some implementations. A user may select (e.g., left click or touch a touch-sensitive display of the computing device 200) the icon 330, which causes the popup menu 334 to appear. The popup menu 334 includes a plurality of selectable options, including a first option 336 to "Sort across Category and Region" (see the break sort in FIG. 3E) and a second option 338 to "Sort within Region"

Figure 3D:
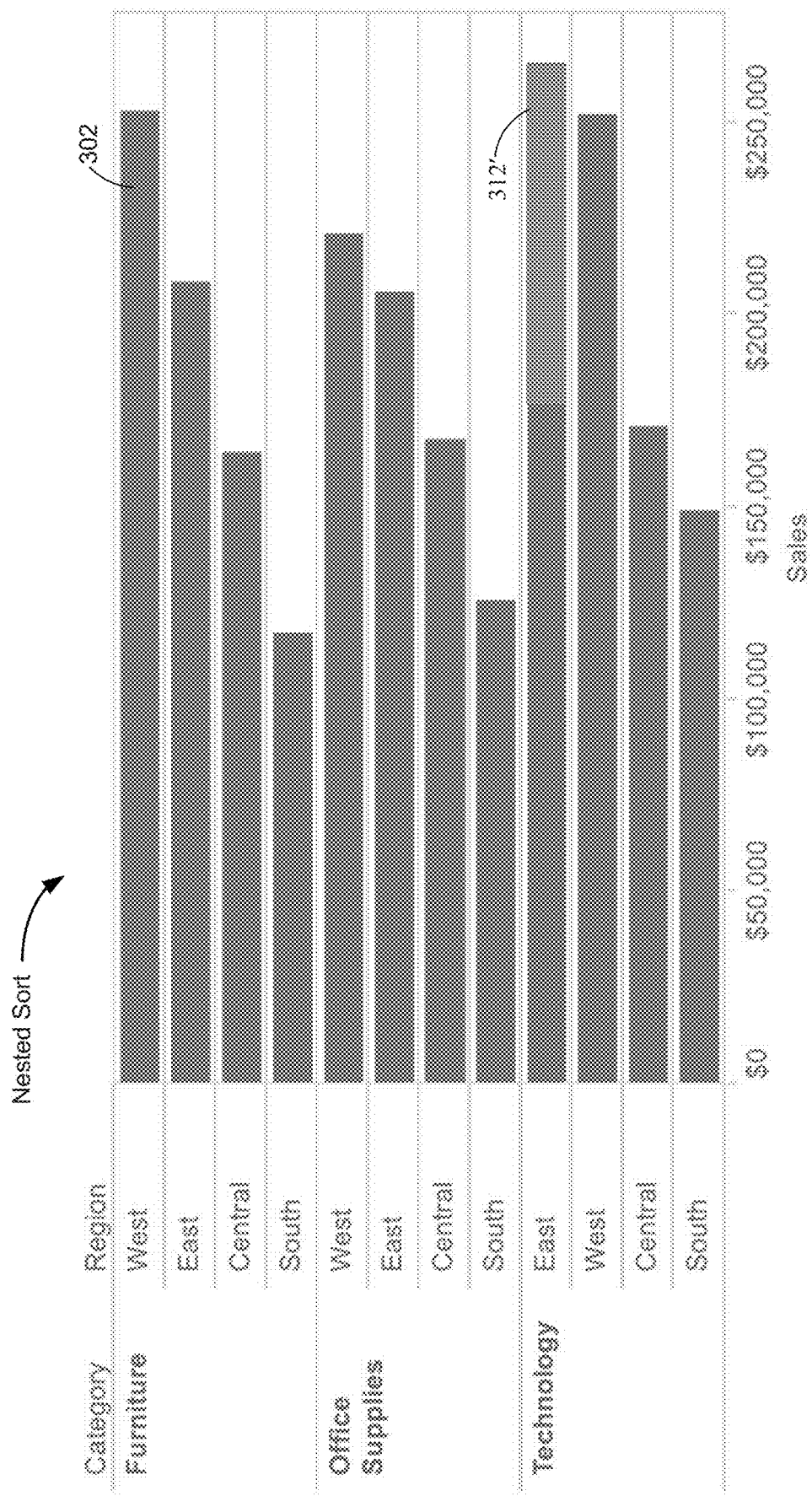
FIG. 3D illustrates a data visualization with a nested sort applied in accordance with some implementations.

(i.e., a nested sort, as illustrated in FIG. 3D). Neither option is currently selected. In some implementations, the icon 330 indicates which, if any, of the options is selected.

When an axis sort icon is used to select a nested sort, it is known that the nested sort is based on an aggregation of the measure on the axis corresponding to the axis sort icon. For example, in FIG. 3C, the axis sort icon 330 is on the Sales axis, so the nested sort is based on SUM(Sales). Note that other measures can be used for a nested sort as well. In particular, the measure used for the nested sort need not be on the columns shelf 120 or the rows shelf 122. The measure used for the nested sort can be on any shelf, or no shelf at all. In order to select a nested sort based one of these other measures, a user can invoke a drop down menu or a toolbar icon and specify the measure used for the nested sort.

In some implementations, instead of the popup menu 334 being displayed after user selection of the icon 330, the computing device 200 cycles through the various sort operations in response to user selection of the cycle icon 332. Upon each selection of the cycle icon 332, the computing device 200 updates the data visualization according to the selection. In this way, the computing device 200 quickly displays each of the sort operations for the user. As more data fields are added to the shelves, additional sort options are added to the popup menu 334 or included in the cycling options. In some implementations, a user can select a nested sort with a single click of the cycle icon.

FIG. 3D illustrates a nested sort for the same data displayed in FIG. 3A. In this case, the sorting within each of the panes is independent of the sorting in the other panes. Specifically, each pane corresponds to a single category, and the ordering of the marks are based on the sum of sales for each region within the designated category. This is illustrated by the first bar 312' in the third pane. Whereas the West region has the largest sales for both the first and second panes, the East region has the largest sales (represented by the first bar 312') in the third pane.

Figure 3E:
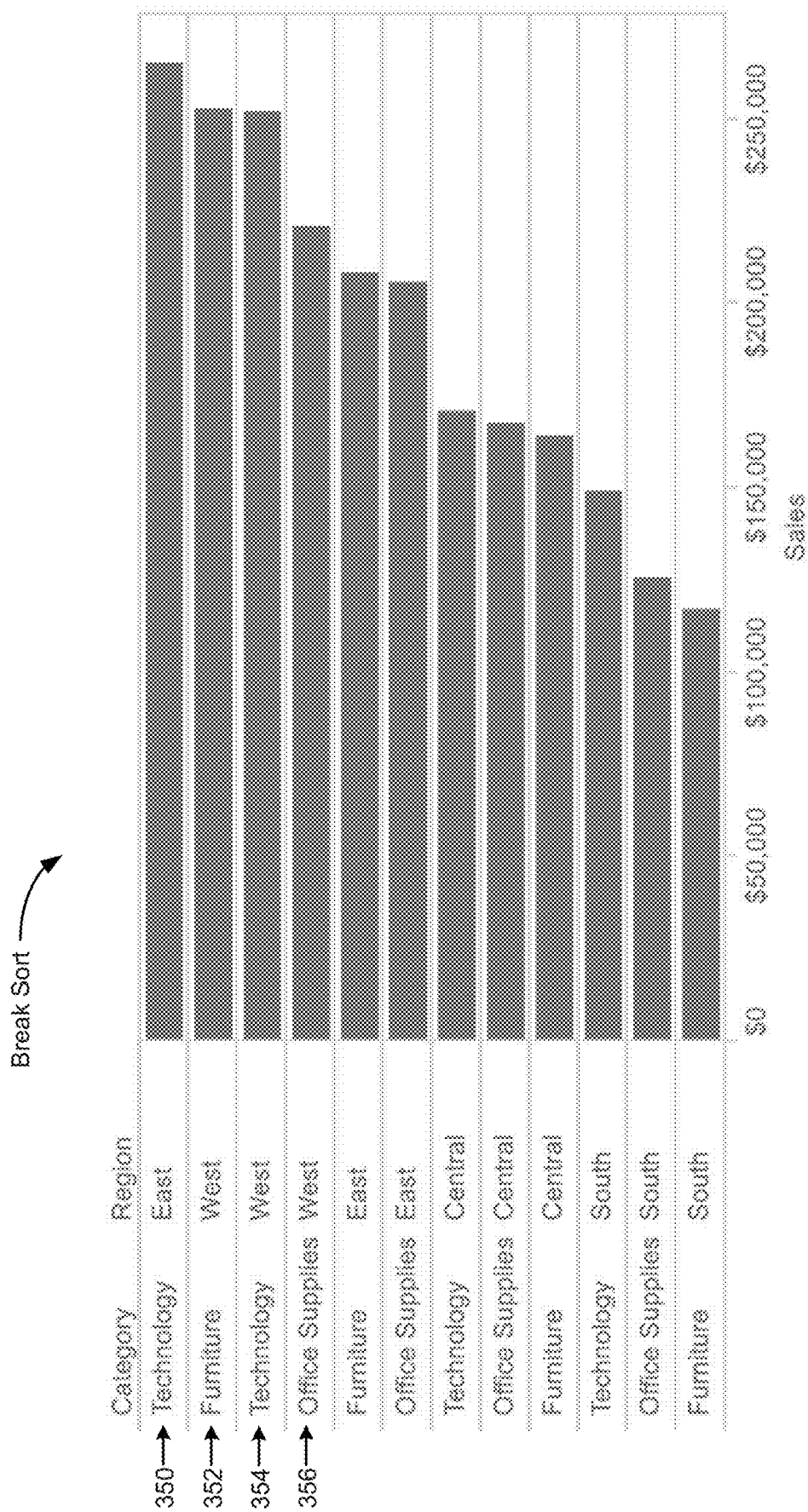
FIG. 3E illustrates a data visualization with a break sort applied in accordance with some implementations.

FIG. 3E illustrates a break sort for the same data displayed in FIGS. 3A and 3D. As indicated by the description "Sort across Category and Region" in the first option 336, the data marks are sorted according to the total sales for each (Category, Region) combination. Because the sorting is based on the combination of category and region, there are no longer panes for each category. As shown by the top four rows in this sorted data visualization, the first row 350 and the third row 354 are both for the Technology category, separated by the second row 352, which is in the Furniture category. In addition, the second row 352, the third row 354, and the sixth row 356 are all from the West region.

More generally, suppose a user places a plurality of dimensions onto the rows shelf 122 (or the columns shelf 120). A simple nested sort is based on summing sales (or whatever measure is on the columns shelf) for the innermost dimension on the rows shelf (i.e., the rightmost data field in these examples). The rest of the dimensions create panes (including nested panes). When there are more than two dimension data fields on the rows shelf, there are additional options 334 displayed in the popup menu, each additional option corresponding to adding one more of the dimensions. For example, suppose the rows shelf has four dimension fields D1, D2, D3, and D4, in that order. The axis sort icon 330 provides four options: (a) sort across D1, D2, D3, and D4; (b) sort across D2, D3, and D4; (c) sort across D3 and D4; and (d) sort on D4. The last option is a simple nested sort. The first option is a full break sort. The second and third options are hybrid sort options that use nesting, but combine some data fields together.

Figure 4A:
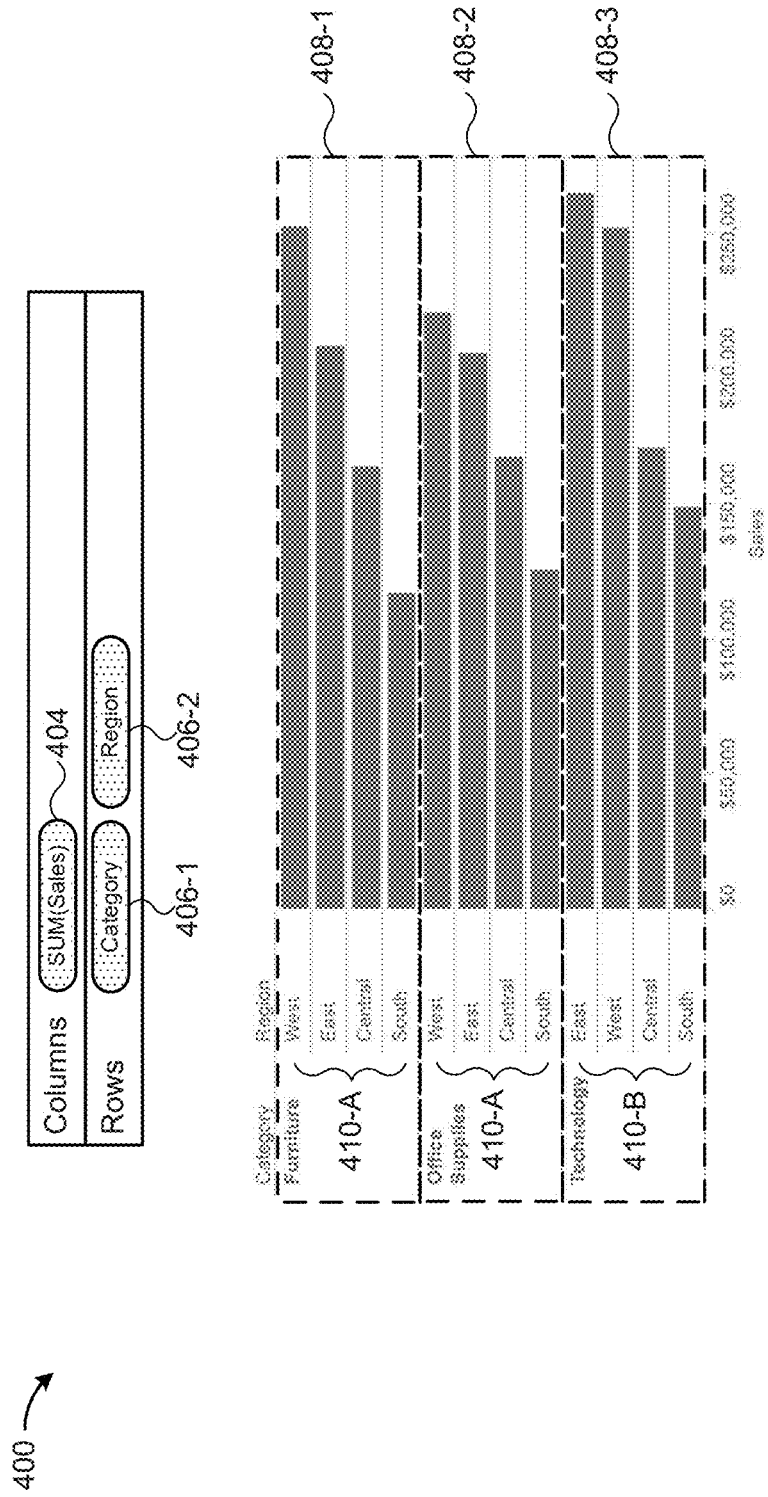
FIGS. 4A-4F illustrate various data visualizations with data marks sorted using a nested sort operation in accordance with some implementations.

FIG. 4A illustrates a data visualization 400 with data marks sorted using a nested sort operation in accordance with some implementations. In some implementations, the computing device 200 generates and displays the data visualization 400 after receiving user actions to: (i) associate a first data field Sales 404 with a first shelf (e.g., the columns shelf 120) and (ii) associate a second data field Category 406-1 and a third data field Region 406-2 with a second shelf (e.g., the rows shelf 122). The received user actions at least partially compose a visual specification 236. The Category field 406-1 is positioned at an outer-most position on the second shelf (i.e., farthest left) and the Region field 406-2 is positioned at an inner-most position on the second shelf (i.e., farthest right). It should be noted that the discussion equally applies to situations where the first data field 404 is associated with the rows shelf 122 and the second and third data fields 406-1 and 406-2 are associated with the columns shelf 120. Switching the roles of columns and rows here would result in a vertical bar graph.

In some implementations, the computer 200 generates a nested sort according to user selection. In some implementations, the user interacts with a user interface affordance displayed in the data visualization region to specify a nested sort operation. For example, with reference to FIG. 3C, the user selects the axis sort icon 330, then selects the second popup option "Sort within Region" 338. In some implementations, the user's selection is saved in the visual specification 236.

A nested sort operation resolves the apparent anomaly presented in FIG. 3A. In particular, the nested sort operation orders the data marks in each pane independently. For example, the computing device 200 generates and displays the data visualization 400. In generating and displaying the data visualization 400, the computing device 200 partitions data for the first, second, and third fields into three panes 408-1, 408-2, and 408-3. Each pane corresponds to a respective distinct value of the second data field 406-1 (the Category field).

Figure 4B:
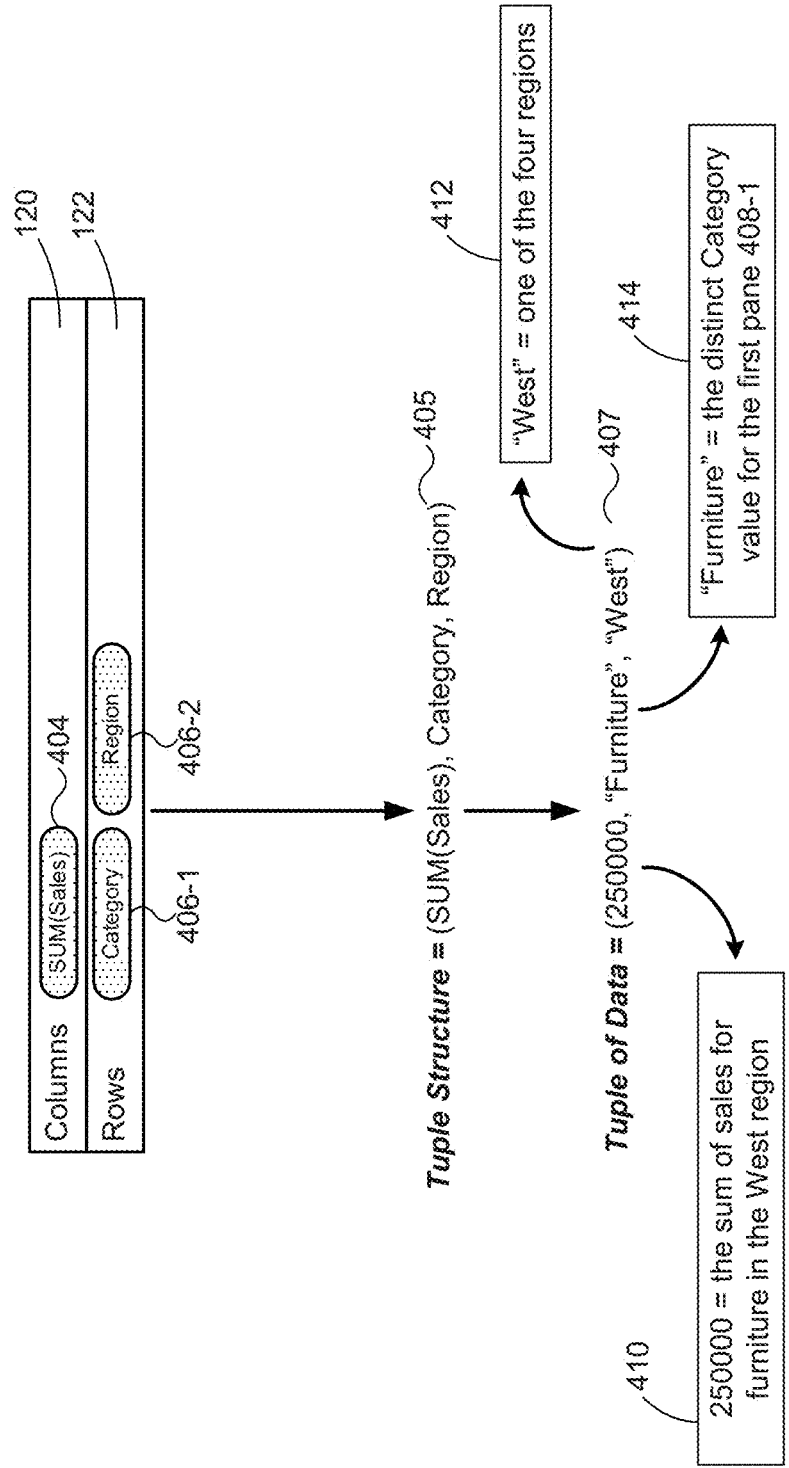

The computing device 200 thus partitions retrieved data into groups of tuples, where: (i) each tuple includes data for the first, second, and third data fields, and (ii) each group of tuples corresponds to a respective distinct value of the second data field 406-1 (e.g., the category field). Referring to FIG. 4B, tuples are constructed according to the user selected data fields on the rows and columns shelves. The tuple structure 405 includes the first, second, and third data fields SUM(Sales), Category, and Region. Note that the data for the second and third data fields (which are dimensions) comprise individual values, whereas the data for the first data field (which is a measure) is a computed aggregate. Each distinct value of the second data field (Category) defines a pane. For ease of discussion, the second field 406-1 includes only three distinct values: "Furniture," "Office Supplies," and "Technology." However, one skilled in the art will appreciate that any number of panes could be included in the plurality of panes, depending on the data included in the second data field 406-1.

The sample tuple 407 has data that will be displayed as one visual mark (e.g., one bar in a bar chart). The second component of the sample tuple 407 is the value "Furniture," which is (414) the distinct Category value for the first pane 408-1. The third component of the sample tuple 407 is the value "West," which is (412) one of the four regions. The first component of the sample tuple 407 is the value 250000, which is (410) the sum of sales for furniture in the West region. The data source here may be individual sales transactions, and each transaction has a Category, a Region, and a Sales amount. In this example, there could be 58 individual transactions (i.e., 58 rows in the data source) having Category="Furniture" and Region="West," with varying Sales amounts. The sample tuple 407 aggregates these 58 rows to compute 250000 as the sum of sales. Note that the dimension data in the second and third data fields is not aggregated.

A nested sort operation orders data marks within each pane according to aggregated data values in the first data field 404. Each of the data marks within the respective pane corresponds to a distinct value in the third data field 406-2. For example, the data visualization 400 includes a first pane 408-1, which corresponds to a first distinct value ("Furniture"), a second pane 408-2, which corresponds to a second distinct value ("Office Supplies"), and a third pane 408-3, which corresponds to a third distinct value ("Technology"). In this example, each pane includes four data marks: one data mark for each region defined by the third data field 406-3 (as shown in FIG. 4B). Note that each pane need not include all of the regions (e.g., there could be no sales of office supplies in the South region).

Within each pane, the computing device 200 displays a respective plurality of data marks, where each data mark corresponds to a respective tuple in the respective group of tuples. Referring to FIG. 4B, a respective tuple 407 in the first group of tuples, which corresponds to the first pane 408-1, includes the data values 250000, "Furniture," and "West." A respective tuple in the third group of tuples, which corresponds to the third pane 408-3, includes the data values of 149000, "Technology," and "South."

Based on the total sales per Region (within a specific Category), the data marks within the first pane 408-1 and the data marks within the second pane 408-2 are ordered in a first order 410-A. The first order 410-A is: West, East, Central, South. However, the data marks within the third pane 408-3 are ordered in a second order 410-B that differs from the first order 410-A. The second order 410-B is: East, West, Central, South. The difference between the first order 410-A and the second order 410-B results from the data values within each respective pane being evaluated per pane (i.e., within a Category), which is not the case with the legacy sort operation described above with reference to FIG. 3A.

Figure 4C:
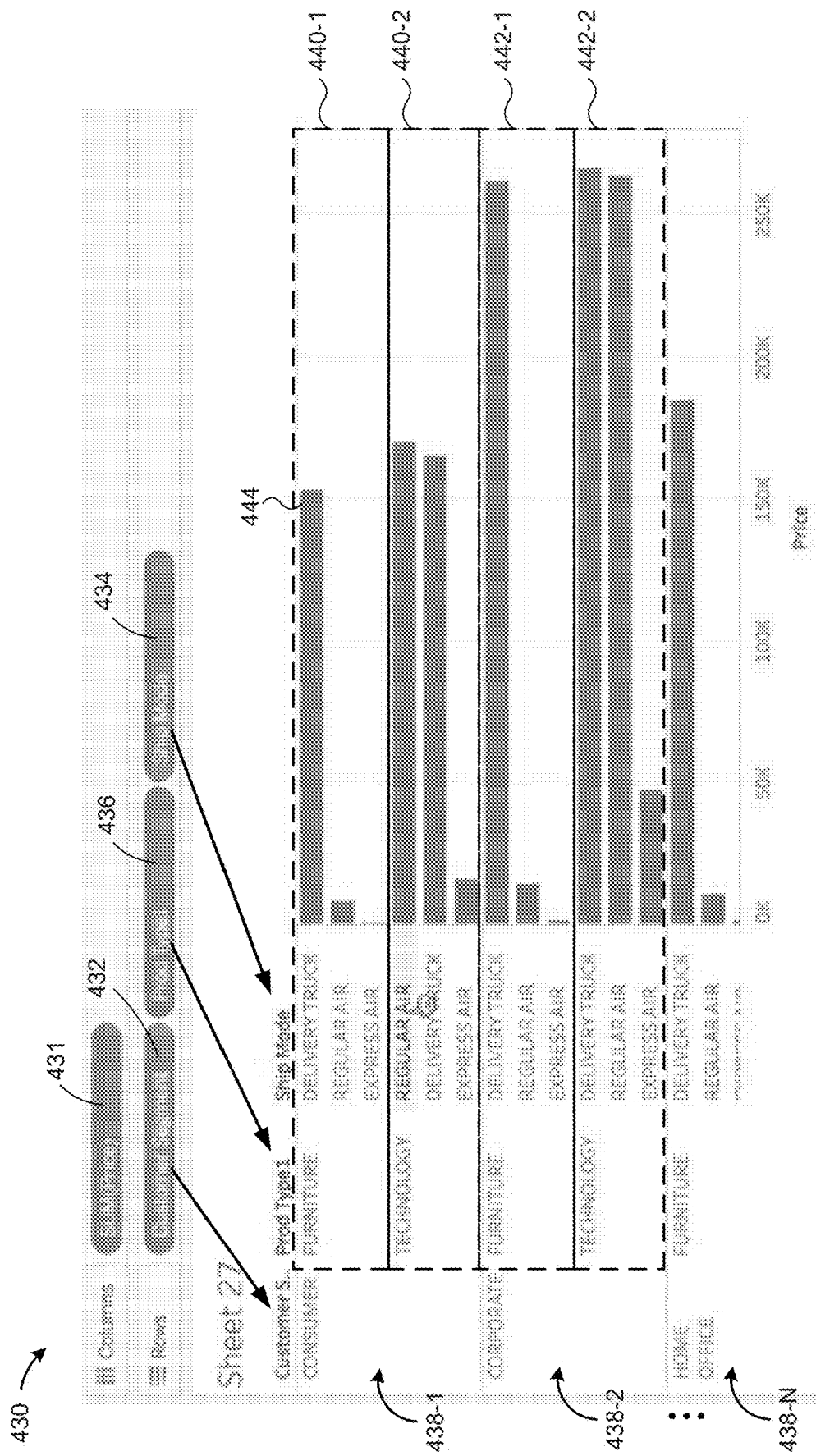

FIG. 4C illustrates a data visualization 430 with data marks sorted using a nested sort operation when there are three dimension data fields associated with a shelf in accordance with some implementations. In this example, the user has associated a first data field Price from the schema information region 110 with the columns shelf 120, which becomes "SUM(Price)" 431 by default (data for measure fields are typically added). In addition, the user has associated three other data fields from the schema information region 110 with the rows shelf 122.

The Customer Segment field 432 is positioned at the outer-most position on the rows shelf 122, the Ship Mode field 434 is positioned at the inner-most position on the rows shelf 122, and the Prod Type1 field 436 is positioned in a central position between the outer-most position and the inner-most position. Accordingly, the horizontal bar chart is partitioned into a plurality of panes 438-1 to 438-N, where each of the plurality of panes corresponds to customer segment (i.e., the panes are separated according to distinct values of the data field in the outer-most position on the rows shelf 122). In some implementations (as shown), the panes 438-1 to 438-N are ordered alphabetically. In some implementations, the user specifies the alphabetic ordering (e.g., as shown and described with reference to FIG. 3B). In some instances, an alphabetic sort occurs by default.

Each of the plurality of panes 438-1 to 438-N is further partitioned into one or more subpanes, where each of the subpanes is defined according to a data value of the Prod Type1 field 436 (i.e., separated according to distinct values of the data field in the central position on the rows shelf 122). For example, the first pane 438-1 is partitioned into two subpanes 440-1 and 440-2, and the second pane 438-2 is partitioned into two subpanes 442-1 and 442-2.

The nested sort operation here is applied to each subpane, so data marks for the Ship Mode field 434 within each subpane are sorted based on sum of price. In this particular example, the Ship Mode field 434 can have one of three shipping mode values: (i) delivery truck, (ii) regular air, and (iii) express air, and each data mark with a respective subpane corresponds to one of these shipping modes. (In some instances, the shipping modes are stored as codes, such as a numeric code or a two character code.) The first subpane 440-1 in the first pane 438-1 illustrates that consumers paid the most to ship furniture by delivery truck. The second subpane 440-2 in the first pane 438-1 illustrates that consumers paid the most to ship technology products by regular air. Further, the second subpane 442-2 of the second pane 438-2 illustrates that corporations paid the most to ship technology products by delivery truck.

Because nested sorting applies within each subpane, the panes and/or subpanes can be sorted in any order without altering the nested sort within each of the subpanes.

Figure 4D:
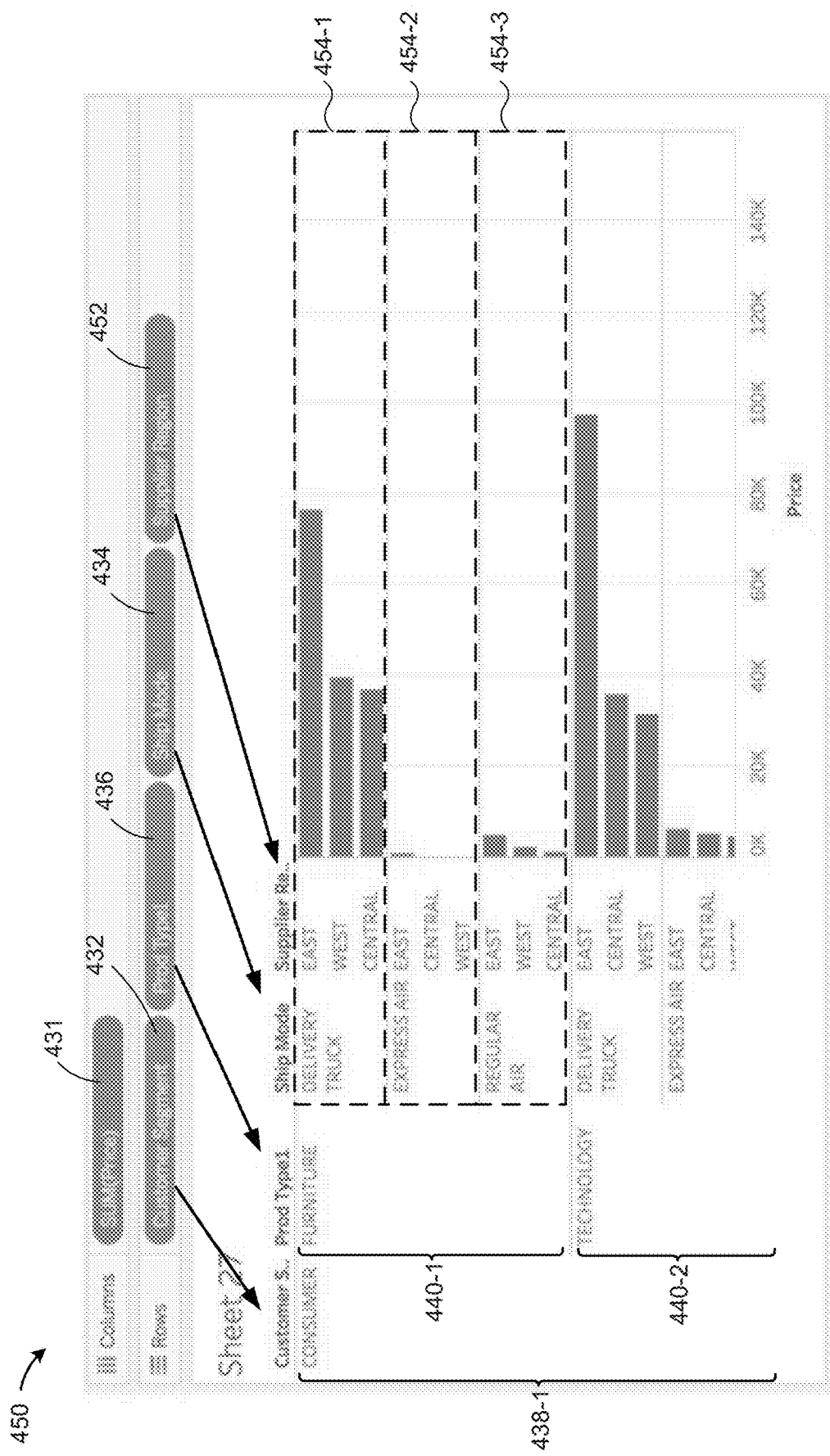

Turning to FIG. 4D, the user has added the Supplier Region field 452 to the rows shelf 122. In particular, the Supplier Region field 452 is positioned at the inner-most position on the rows shelf 122, so the Ship Mode 434 is now positioned at a central position between the outer-most position and the inner-most position. The subpane 440-1 is partitioned into a set of sub-subpanes 454-1, 454-2, and 454-3. Each of the sub-subpanes corresponds to a Ship Mode 434 (i.e., separated according to distinct values of the Ship Mode within the Customer Segment and Prod Type1). The computing device 200 has created a subgroup for each distinct combination of values for the second, third, and fourth fields. For example, a first distinct combination of values is "Consumer," "Furniture," and "Delivery Truck," which defines the first sub-subpane 454-1. A second distinct combination of values is "Consumer," "Furniture," and "Express Air," which defines the second sub-subpane 454-2.

The nested sort operation now applies to the Supplier Region field 452 because the supplier region field 452 is positioned at the inner-most position in the rows shelf 122. Accordingly, the nested sort operation is applied to each sub-subpane 454-1, 454-2, and 454-3. The data marks within each sub-subpane are sorted based on sum of price (descending by default). In this particular example, the Supplier Region field 452 includes three regions: (i) East, (ii) West, and (iii) Central, and each data mark within a respective subpane corresponds to one of those regions. For example, the first sub-subpane 454-1 illustrates that for consumers shipping furniture by delivery truck, the East region had the greatest amount. Moreover, the second sub-subpane 454-2 illustrates that for consumers shipping furniture by express air, the East region still has the greatest amount.

In some implementations, when a new innermost data field is added (such as adding the "Supplier Region" going from FIG. 4C to FIG. 4D), the nested sort is automatically reapplied to the new innermost data field. In other implementations, when a new innermost data field is added, the previous nested sort is removed, and it is up to the user to decide whether to apply a nested sort to the new innermost data field. In some implementations, when a user adds the new data field, the data visualization application 228 prompts the user on how to update the sorting (e.g., remove the nested sort completely or perform the nested sort on the new innermost data field).

Figure 4E:
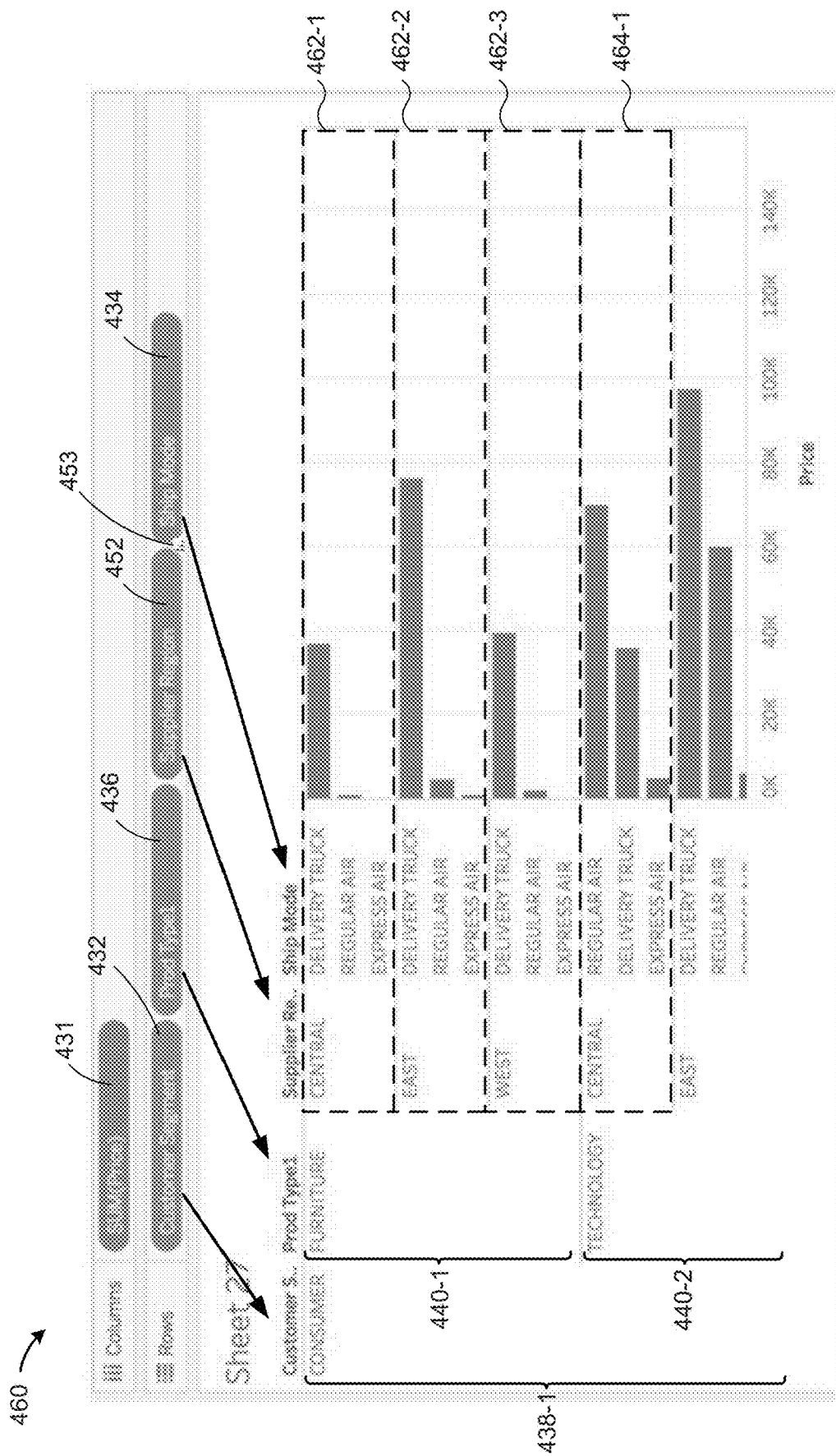

FIG. 4E is similar to FIG. 4D, but the Supplier Region field 452 is placed before the Ship Mode field 434 on the rows shelf. Starting from the user selections shown in FIG. 4C, a user could get here by inserting the new field Supplier Region 452 onto the rows shelf at this intermediate location. Alternatively, a user could get here from the user selections shown in FIG. 4D by swapping the positions of the last two data fields 434 and 452 on the rows shelf (by moving either one of these fields).

The Ship Mode field 434 remains at the inner-most position on the rows shelf 122 and the Supplier Region field 452 is positioned at a central position between the outermost position and the inner-most position. The subpane 440-1 is partitioned into a set of sub-subpanes 462-1, 462-2, and 462-3, and so on. Each sub-subpane corresponds to a distinct data value for the Supplier Region field 452 within the combination of Consumer Segment and Prod Type1. The computing device 200 has created subgroups of tuples, where each subgroup includes a set of distinct values for the Consumer Segment field 432, the Prod Type1 field 436, and the Supplier Region field 452. For example, a first set of distinct values is "Consumer," "Furniture," and "Central," which defines the first sub-subpane 462-1. A second set of distinct values is "Consumer," "Furniture," and "East," which defines the second sub-subpane 462-2.

If FIG. 4E follows FIG. 4C, then the nested sort operation for the Ship Mode field 434 remains in effect because it is still the innermost data field on the rows shelf. On the other hand, if FIG. 4E follows FIG. 4D, the previous nested sort on the Supplier Region 452 is removed. In some implementations, the data visualization application 228 automatically applies the nested sort to the new innermost data field. In some implementations, the user has to specifically choose to have a nested sort apply to the new innermost data field. In some implementations, the data visualization application 228 determines that the former nested sort is no longer possible, and prompts the user to decide whether to apply a nested sort to the new innermost data field on the rows shelf. In some implementations, the default behavior is determined by a set of stored user preferences and/or prior selections by the user (e.g., based on what has the user chosen previously when the active nested sort is no longer possible).

The nested sort operation is applied to each sub-subpane 462-1, 462-2, and 462-3. In this way, the data marks within each sub-subpane are sorted based on the sum of price (e.g., in descending order). In this particular example, the Ship Mode field 434 has three distinct data values: (i) "Delivery Truck," (ii) "Regular Air," and (iii) "Express Air." Each data mark within a sub-subpane corresponds to one of these Shipping Mode values. For example, the first sub-subpane 462-1 illustrates that consumers buying furniture in the Central region have the items shipped primarily by delivery trucks. The second sub-subpane 462-2 illustrates that consumers buying furniture in the East region also select shipping by delivery truck most of the time. On the other hand, the fourth sub-subpane 464-1 shows that consumers buying technology products in the central region tend to ship by regular air. The data marks in the fourth sub-subpane 464 are ordered differently ("Regular Air" is first) from the data marks in the first three sub-subpanes.

FIGS. 4D and 4E illustrate that nested sorting applies to the innermost data field, whereas the remainder of the data fields create panes (and subpanes, and sub-subpanes, . . . ). The sorting of the panes (and any levels of subpanes) is independent of the nested sorting that occurs in the innermost panes. As illustrated by the options 334 in FIG. 3C, when there are multiple data fields on the rows shelf (or columns shelf), a simple nested sort is not the only option. For example, with the four fields in FIG. 4E, one of the sort options is to "Sort across Customer Segment, Prod Type1, Supplier Region, and Ship Mode." In this case, the data visualization application creates a break sort using all four data fields, and there is a single pane. Another option is to "Sort across Prod Type1, Supplier Region, and Ship Mode." In this case, the outermost dimension (Customer Segment 432) is not included in the sort, so there are panes created for each distinct value of Customer Segment, and the tuples are sorted within each of these panes. This is essentially a nested sort based on a combined data field Prod Type1+Supplier Region+Ship Mode. Finally, there is an option to "Sort across Supplier Region and Ship Mode." When this is selected, panes are created for each distinct Customer Segment, subpanes are created for each Prod Type1 within each Customer Segment, and there is a "nested sort" for the data marks within the subpanes. The "nested sort" here is based on the combination of the fields Supplier Region+Ship Mode.

In some implementations, a marker is placed on the shelf that has the dimension fields to indicate which data fields are involved in the sort. In some implementations, the marker is placed just to the left of the data fields that are included in the sort. For example, in FIG. 4E, the marker 453 indicates that only the innermost data field Ship Mode 434 is included in the sort (a simple nested sort). If the Supplier Region 452 were also included in the sort, the marker 453 would be placed to the left of the Supplier Region pill. In some implementations, the markers are informational only; in other implementations, a user can move the marker to adjust the sorting.

When there is only one dimension field, there is no outer dimension to create panes, so a legacy sort and a nested sort are the same. Typically, the term "nested sort" is used to indicate the presence of two or more dimension fields on one of the shelves.

The examples illustrated above have a measure field 431 placed on the columns shelf 120 and two or more dimension fields placed on the rows shelf, which has been illustrated as horizontal bar charts. However, these roles can easily be reversed, with nested sorting applying to vertical bar charts. In addition, some implementations apply these techniques to data fields placed on other shelves as well, and are not limited to bar charts.

Figure 4F:
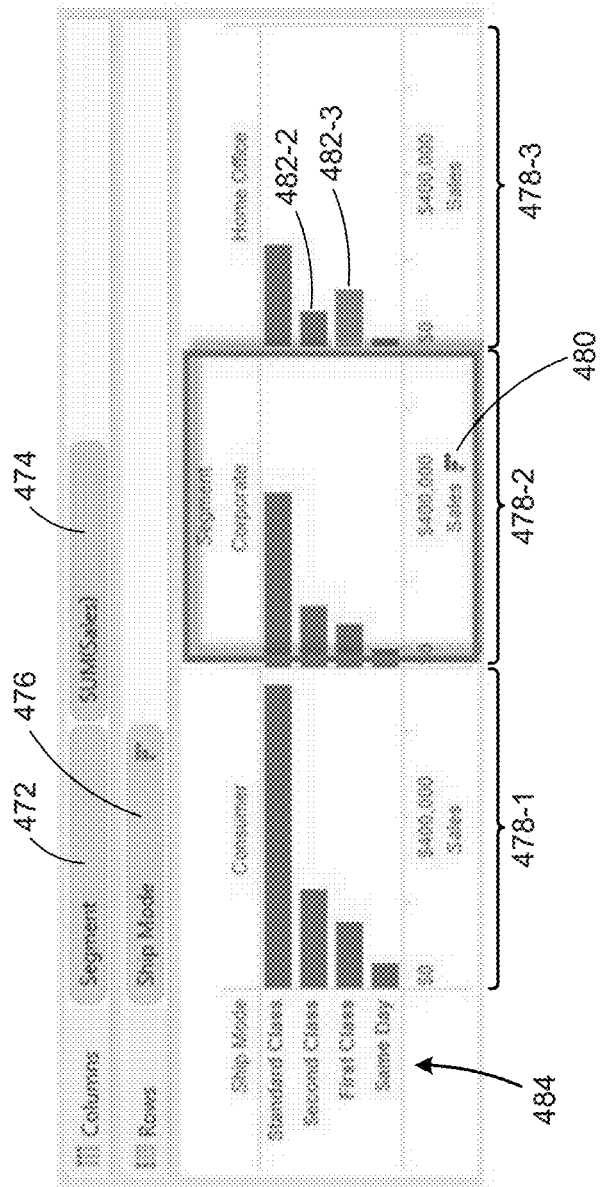

FIG. 4F illustrates applying nested sorting when the dimension fields are not all on a single shelf. In this example, the data source includes shipping transactions. Each transaction has a Price, a Segment (Consumer, Corporate, or Home Office), and a Ship Mode (Standard Class, Second Class, First Class, and Same Day). The data source also includes other data fields not illustrated in FIG. 4F (such as a ship date, a destination address, and a weight).

In FIG. 4F, a user has placed the Segment field 472 and the Sales field 474 on the columns shelf 120 (the Sales field is rendered as SUM(Sales) by default). In addition, the user has placed the Ship Mode data field 476 on the rows shelf 122. Based on these user selections, the data visualization application generates three horizontally aligned bar charts 478-1, 478-2, and 478-3. Each one of the bar charts is displayed in a pane corresponding to a distinct Segment value. Initially, each of the bar charts is displayed without sorting (e.g., displayed in the order they are received from the data source). Applying a legacy sort, each of the three bar charts is sorted according to totals for each ship mode. When all three of the panes are sorted in the same way (as illustrated in FIG. 4F), a single set of labels 484 can be applied to all three panes.

In this arrangement, a user can choose to sort one of the panes independently of the other panes using an axis sort icon 480. If a "nested sort" is selected for the "Corporate" pane 478-2, the data marks within the pane are sorted using just the sales data for the "Corporate" segment. When separate sorting is applied to each of the panes, each pane has its own set of Ship Mode labels to identify the data marks.

As illustrated in FIG. 4F, the "Home Office" pane 478-3 has data marks that are not sorted according to total sales in the Home Office segment. In particular, the First Class mark 482-3 is larger than the Second Class mark 482-2, but the First Class mark 478-3 is listed third in order to align the data in all three panes. If the user chooses to apply a nested sort to the third pane 478-3, the First Class mark and Second Class mark will be reversed, with labels added to indicate the ordering.

Figure 5:
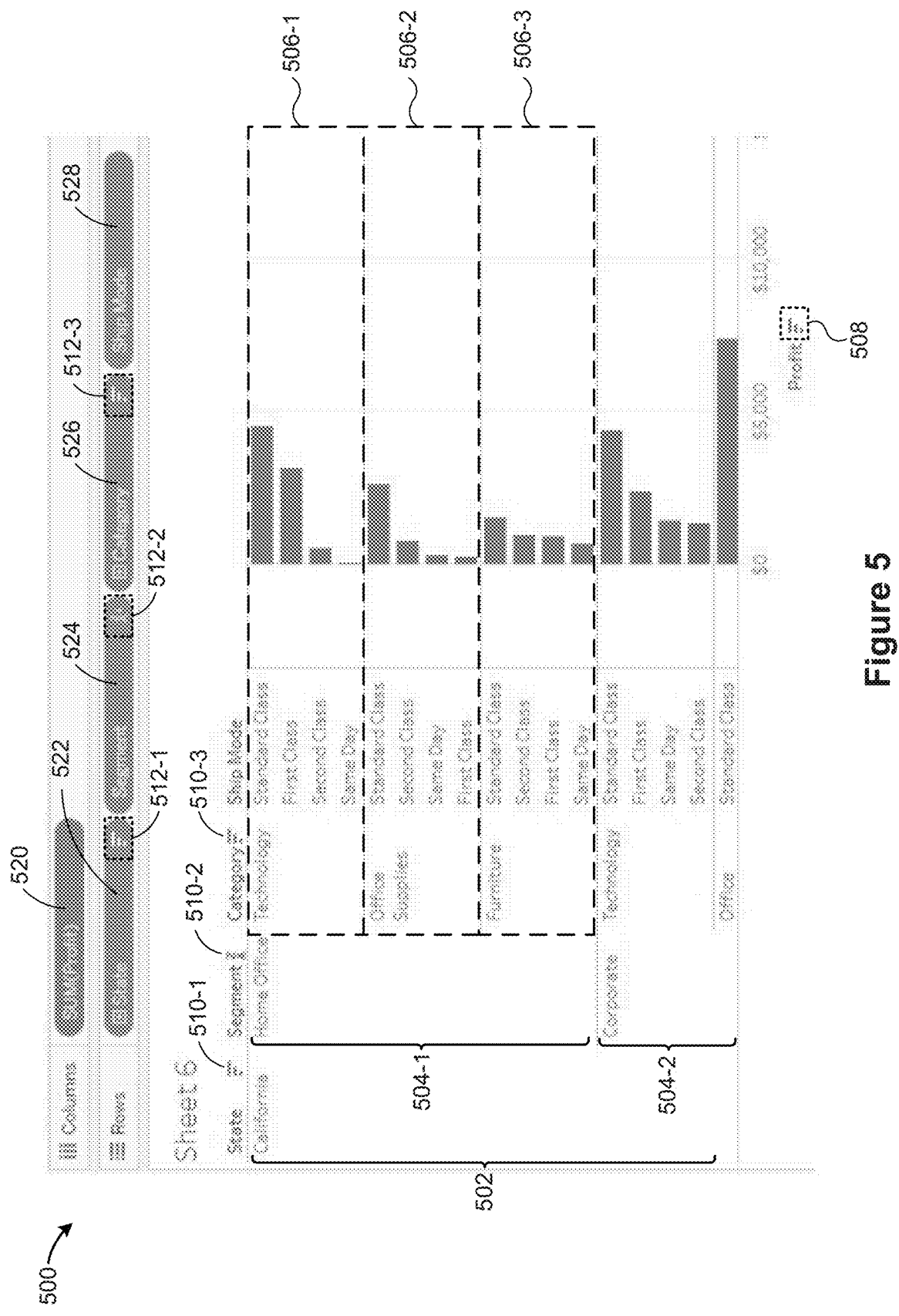
FIG. 5 illustrates the compatibility of a nested sort on the innermost dimension field with other sorts on the other dimension data fields.

FIG. 5 provides a data visualization 500, which further demonstrates the compatibility of a nested sort on the innermost dimension field with other sorts on the other dimension data fields. In this example, the user associates a first data field "SUM(Profit)" 520 from the schema information region 110 with the columns shelf 120 and associates four other data field fields 522, 524, 526, and 528 from the schema information region 110 with the rows shelf 122. In response, the computing device 200 generates and displays the data visualization 500, which includes a horizontal bar chart separated (i.e., partitioned) into a plurality of panes, where each of the plurality of panes corresponds to a state. Only the first pane 502 is depicted. Each pane in the horizontal bar chart is further separated into subpanes (e.g., the subpanes 504-1 and 504-2), where each subpane corresponds to a distinct segment within a state. Continuing, each subpane is further divided into sub-subpanes (e.g., sub-subpanes 506-1, 506-2, and 506-3), where each sub-subpane corresponds to a distinct category within a specific state and segment.

A sort operation specified within a row or column header (e.g., sorts specified by the sort icons 510-1, 510-2, and 510-3) or within the rows shelf 122 or the columns shelf 120 (e.g., sorts specified by the sort icons 512-1, 512-2, and 512-3) is sometimes referred to as a header sort. The computing device 200 indicates that a respective field is subject to a header sort by including a symbol within the respective data field (e.g., the symbols 512-1, 512-2, and 512-3). In contrast, a sort operation specified using an affordance along an axis of the data visualization is sometimes referred to as an axis sort. In some implementations, the computing device 200 indicates that a respective field is subject to an axis sort by including a symbol 508 next to a label of the axis. In some implementations, a nested sort is activated via the affordance along the axis, as described above with reference to FIG. 3C. The affordance along an axis may be along an X-axis or a Y-axis. It should be noted that a nested sort can be activated using various other affordances and features presented in the data visualization application 228 and the affordance along the axis is merely one way to activate a nested sort.

In some instances, each of the fields on the rows shelf 122 is subject to a sort operation (e.g., an alphabetic sort, a legacy sort, or a nested sort). For example, the state field has a legacy sort (the states are ordered according to total sales per state in a descending order); the segment field has an alphabetic sort going from Z to A; the category field has a legacy sort, which sorts the sub-subpanes 506-1, 506-2, and 506-3 according to total sales per category in a descending order (the totals are computed across the full data set, and not just for each specific sub-subpane); and the ship mode field has a nested sort. For example, the individual shipping modes, and in turn the data marks within each sub-subpanes 506-1, 506-2, and 506-3, are ordered according to sales per shipping mode within the respective subpane. In this way, each sub-subpane computes its own order for the data marks in the sub-subpane, as discussed above with reference to FIGS. 4A-4E.

In some instances, a user chooses to add a sort operation to a data field that is already subject to a different sort operation. For example, the user may add an alphabetical sort to the ship mode field, which is already subject to a nested sort, as indicated by the axis sort icon 508. In some implementations, the nested sort overrides the header sort, or vice versa. In some implementations, whether a respective sort operation is overridden depends on a level of priority for the respective sort operation. For example, a first sort operation with a first level of priority overrides a second sort operation with a second level of priority (the first level of priority is a higher priority than the second level of priority). In some implementations, the various levels of priority are user defined. In some implementations, selecting a new sort for a data field always overrides the previous sort (if any) for the same data field.

Figure 6:
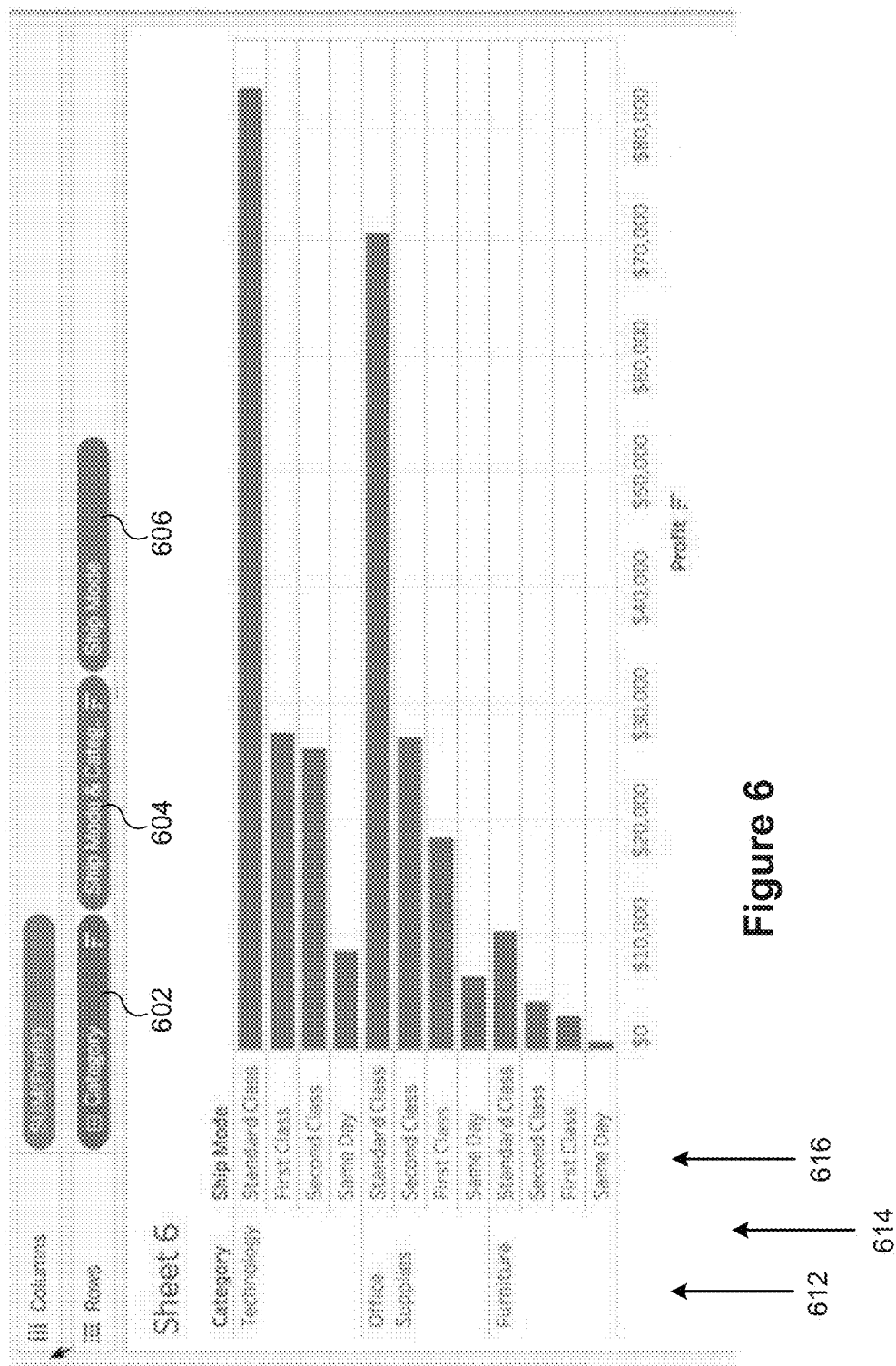
FIGS. 6 and 7 illustrate data visualizations with data marks sorted using a nested sort operation, where the visual specification includes a combined data field, in accordance with some implementations.
Figure 7:
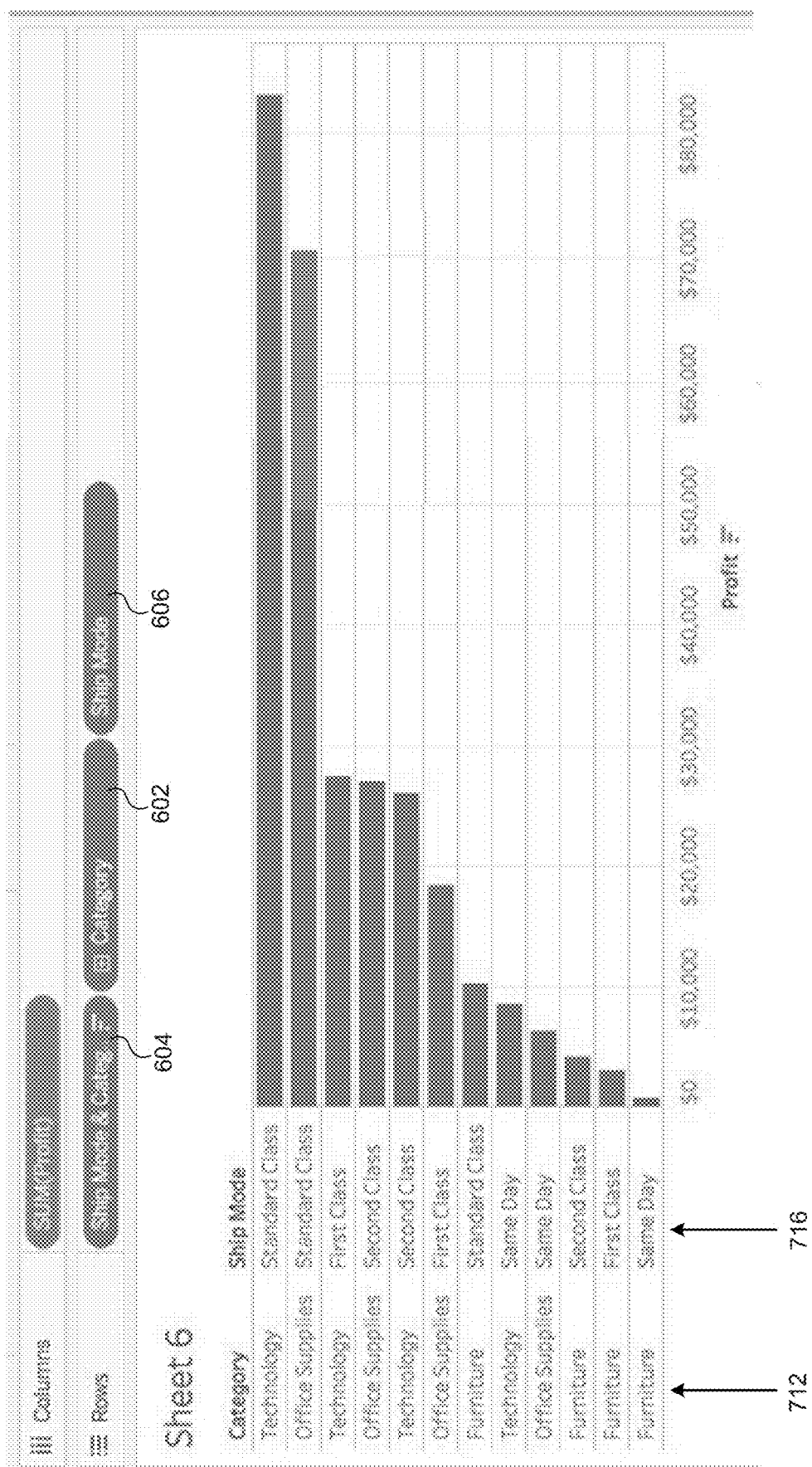

FIGS. 6 and 7 illustrate one way that nested sorting and break sorting can be implemented. In these figures, a combined data field 604 is added to the rows shelf 122. The combined data field 604 includes both Ship Mode and Category, and can be implemented as a concatenation of these two data fields. In some implementations, a combined data field is stored as an ordered pair (or other format) instead of a concatenation. The data visualization includes a Category column 612 corresponding to the Category data field 602 and a Ship Mode column 616 corresponding to the Ship Mode data field 606. However, the combined data field 604 has a property set to hide/remove the column 614 corresponding to the combined data field 604. In this way, the data from the combined data field 604 can be used for sorting, but does not add redundant or confusing data to the data visualization. Note that the nested sort shown (with Ship Modes sorted independently within each category) is actually implemented by a header sort on the combined data field 604. In some implementations, the combined data field is stored in the visual specification 236, but not shown on the rows shelf, because this implementation detail is generally not relevant to the user. The use of combined data fields also facilitates preserving an existing sort when a user switches to a different data visualization type (e.g., from a bar chart to a table). Because a combined data field can be used like any other data field, retaining the data field when changing the data visualization type effectively retains the user's selected sort, even when the combined data field is not displayed.

Some implementations use alternative techniques (not creating combined fields) for nested sorting and break sorting (e.g., using an additional property on the data column that specifies nested sorting, and computing the appropriate aggregates within the proper nesting level).

The position of the combined data field 604 affects the resulting data visualization. For example, in FIG. 6, the combined data field 604 is positioned immediately before the innermost data field 606, so the result is a nested sort on the innermost dimension 606, similar to the data visualizations shown in FIGS. 4A-4E. In FIG. 7, however, the combined data field 604 is positioned in an outer-most position in the rows shelf, so the combined data field 604 controls the primary sort of the entire data visualization. Because the sorting here uses both Ship Mode and Category, it completely determines the order for the rows in the data visualization. There are no panes because there is no grouping by Category or Ship Mode. This is sometimes referred to as a break sort, as illustrated above in FIG. 3E. Some implementations provide an affordance to select a break sort, as illustrated in FIG. 3C. Just like nested sorting, break sorting can be implemented with or without a combined data field. Although the combined data field 604 is used to define the order of the data, the combined data field 604 is not displayed in the data visualization (e.g., it has a property set to hide the column corresponding to it). Instead, the Category data field 602 is on the rows shelf, creating the Category column 712, and the Ship Mode data field 606 is on the rows shelf, creating the Ship Mode column 716. Note that switching the positions of the Category data field 602 and the Ship Mode data field 606 on the rows shelf would switch the columns 712 and 716 in the data visualization, but would not affect the order of the data marks (the order is determined by the combined data field 604).

In FIGS. 6 and 7, the combined data field is "Ship Mode & Category" 604. In this example, because the sorting on the combined field is based on the SUM(profit) for the combined field, the order of the two data fields in the combination does not affect the sort. That is, a combined data field "Category & Ship Mode" would yield the same sort. On the other hand, if an alphabetic sort were applied to a combined field, the order of the fields in the combination would be relevant.

FIGS. 8A-8D provide a flow diagram illustrating a method 800 of performing a nested sort operation in a data visualization. The steps of the method 800 may be performed by a computer (e.g., a computing device 200). In some implementations, the computer includes (802) a display (e.g., the display 200), one or more processors (e.g., the processor(s) 202), and memory (e.g., the memory 206). FIGS. 8A-8D correspond to instructions stored in a computer memory or computer-readable storage medium (e.g., the memory 206 of the computing device 200). The memory stores one or more programs configured for execution by the one or more processors. For example, the operations of the method 800 are performed, at least in part, by a data visualization generation module 232 and/or a sorting module 234.

In performing the method 800, the computer displays (804) a user interface on the display. The user interface (e.g., an instance of the user interface 100) includes (804) (i) a schema information region 110 containing a plurality of data fields and (ii) a data visualization region 112 having a plurality of shelves. For example, with reference to FIG. 1, the plurality of shelves includes a columns shelf 120 and a rows shelf 122.

The method 800 further includes receiving (806) user actions to (i) associate a first data field of the plurality of data fields with a first shelf of the plurality of shelves and (ii) associate a second data field and a third data field of the plurality of data fields with a second shelf of the plurality of shelves. The second data field is positioned at an outer-most position on the second shelf and the third data field is positioned at an inner-most position on the second shelf. For example, with reference to FIG. 4A, the Sales field 404 is associated with the columns shelf 120 while the Category field 406-1 and the Region field 406-2 are associated with the rows shelf 122. The Category field 406-1 is positioned at the outer-most (i.e., farther left) position on the rows shelf 122 while the Region field 406-2 is positioned at the inner-most (i.e., farthest right) position on the rows shelf 122. The arrangement of data fields in FIG. 4A is merely one example arrangement of data fields. For example, the arrangement shown in FIG. 4A may be swapped, or additional fields could be added to the rows shelf 122 and/or the columns shelf 120.

In some implementations, the first data field is (808) a measure (e.g., quantitative data) and the second and third data fields are (810) dimensions (e.g., categorical data, which commonly has a string data type).

In some instances, the data visualization application 228 generates (814) and displays (814) an initial data visualization in the data visualization region. When a legacy sort has been selected, the data visualization application 228 computes (812) a respective single aggregate value of the first data field for each distinct value of the third data field. For example, in FIG. 3A, the data visualization application 228 computes total sales for each region regardless of the category. The data visualization application 228 then sorts (814) the plurality of data marks in each of the panes according to the computed aggregate values.

The method 800 further includes receiving (816), via an affordance displayed in the data visualization region, an additional user action to specify a nested sort operation according to data for the first data field and the third data field. For example, with reference to FIG. 3C, the affordance 330 is displayed along an axis in the data visualization region, and user selection of the affordance 330 causes the popup menu 334 to appear. Within the popup menu 334, the user selects the nested sort option 338 (e.g., "Sort within Region"). In some implementations, instead of the popup menu 334 being displayed, the user repeatedly selects a cycle affordance 332 to cycle through the various available sorts. In some implementations, the affordance is displayed in some other portion of the data visualization region, or is a completely different region of the display. Moreover, in some implementations, the nested sort operation is activated using menus within a menu bar (not shown) of the user interface 100. In some implementations, the affordance is displayed (818) in the initial data visualization. In some implementations, the affordance in the initial data visualization is displayed (820) proximate to an axis of the data visualization (e.g., the axis sort icon 508 in FIG. 5).

In some implementations, an axis sort icon is displayed whenever a sort has already been selected, or in response to user action near an axis label (e.g., moving the mouse cursor near the "profit" label along the x-axis in FIG. 5, or contacting a touch screen near the axis label).

The method 800 further includes, in response to receiving the additional user action, generating and displaying (822) a data visualization in the data visualization region in accordance with the user actions and the additional user action. For example, with reference to FIG. 4A, the data visualization 400 is generated and displayed after receiving the user actions to associated the various data fields with the shelves and after receiving the user selection of the affordance 330 (e.g., selection of the nested sort operation within the popup menu 334).

Displaying and generating the data visualization includes partitioning (824) retrieved data into groups of tuples, each tuple including data for the first, second, and third data fields. Each group of tuples corresponds to (824) a respective distinct value of the second data field. For example, with reference to FIG. 4B, each tuple includes data for the Sales field 404, the Category field 406-1, and the Region field 406-2. Each group of tuples corresponds to a distinct value of the Category field 406-1: namely, "Furniture," "Office Supplies," and "Technology." Accordingly, a first group of tuples corresponds to "Furniture," a second group of tuples corresponds to "Office Supplies," and a third group of tuples corresponds to "Technology." Each group of tuples thus corresponds to a respective distinct value for the data field positioned at the outer-most position on the second shelf.

In some implementations, as illustrated in FIG. 4B, the data for the first data field in each tuple is (826) a respective computed aggregate for the first data field, corresponding to the respective data values for the second and third data fields in the respective tuple. In the example of FIG. 4B, each tuple has a unique combination of Category and Region (e.g., "Furniture" and "West") and the first component of the tuple is the sum of sales for all rows in the data source having the unique combination of Category and Region.

Displaying and generating the data visualization further includes forming (828) a plurality of panes, where each pane corresponds to a respective group of tuples. For example, with reference to FIG. 4A, the data visualization 400 includes three panes 408-1, 408-2, and 408-3. The first pane 408-1 corresponds to the first group of tuples, as defined above; the second pane 408-2 corresponds to the second group of tuples; and the third pane 408-3 corresponds to the third group of tuples.

Displaying and generating the data visualization further includes, within each pane, displaying (830) a respective plurality of data marks, each data mark corresponding to a respective tuple in the respective group of tuples. Referring to FIG. 4B, a respective tuple 407 in the first group of tuples, which corresponds to the first pane 408-1, includes the data values (250000, "Furniture", "West"). A respective tuple in the third group of tuples, which corresponds to the third pane 408-3, includes the data values (250000, "Technology", "West").

Displaying the respective plurality of data marks within a given pane includes displaying the respective plurality of marks in order according to data values for the first data field in the respective tuples. Referring again to FIG. 4A, the data marks within the first pane 408-1 are ordered in a first order 410-A according to data values for the Sales field 404 within the furniture category. The data marks within the third pane 408-3 are ordered in a second order 410-B according to data values for the Sales field 404 within the Technology category. The nested sort operation described above allows for data marks within different panes to be independently ordered according to data values within these panes.

In some implementations, the method 800 further includes receiving (832) another user action to perform a header sort operation that sorts the plurality of panes in a pane sort order. The user action is received (832) via a different affordance (e.g., the header sort affordance 510-1 in FIG. 5) displayed in the data visualization region that corresponds to the second data field. The header sort operation is performed (834) based (at least in part) on data for the second field in each respective tuple of data. For example, with reference to FIG. 5, data fields other that the data field in the inner-most position can be subject to other sort operation, such as a legacy sort order that is ascending or descending, as well as alphabetical sort orders.

In some implementations, the method 800 further includes receiving (836) a second additional user action to associate a fourth data field of the plurality of data fields with the second shelf, thereby arranging the fourth data field as the inner-most position in the second shelf instead of the third data field. For example, with reference to FIG. 4C, assume the Ship Mode field 434 has just been added to the rows shelf 122 at the inner-most position in the rows shelf 122.

In some implementations, the method 800 further includes generating and displaying (838) a second data visualization in the data visualization region. Generating and displaying the second data visualization includes repartitioning (840) retrieved data into subgroups of tuples, each tuple including data for the first, second, third, and fourth data fields. Moreover, each subgroup of tuples corresponds to a respective distinct combination of values of the second and third data fields. For example, with reference to FIG. 4C, each tuple includes data for the SUM(price) field 431, the Customer Segment field 432, the Prod Type1 field 436, and the Ship Mode field 434. The Customer Segment field 432 and the Prod Type1 field 436 are the "second data field" and "third data field." Each subgroup of tuples is formed based on a unique combination of values in the Customer Segment field 432 and the Prod Type1 field 436, which include (i) "Consumer" combined with "Furniture" (the first subgroup of tuples), (ii) "Consumer" combined with "Technology" (the second subgroup of tuples), (iii) "Corporate" combined with "Furniture" (the third subgroup of tuples), and so on.

Displaying and generating the second data visualization further includes forming (842) a plurality of subpanes, where each subpane corresponds to a respective subgroup of tuples. For example, with reference to FIG. 4C, the data visualization 430 includes at least two overall panes 438-1 and 438-2. The first pane 438-1 corresponds to the first group of tuples, and the second pane 438-2 corresponds to the second group of tuples. Furthermore, the first pane 438-1 is divided into a first subpane 440-1 and a second subpane 440-2. The first subpane 440-1 corresponds to the first subgroup of tuples, as defined above; the second subpane 440-2 corresponds to the second subgroup of tuples, as defined above; and so on.

Displaying and generating the second data visualization further includes, within each subpane, displaying (844) a respective plurality of data marks, each data mark corresponding to a respective tuple in the respective subgroup of tuples. For example, with reference to FIG. 4C, the data mark 444 corresponds to a respective tuple (180000, "Consumer", "Furniture", "Delivery Truck"). The fields that differentiate subgroups from one another are the Customer Segment field 432 and the Prod Type1 field 436.

Displaying the respective plurality of data marks includes (844) displaying the respective plurality of marks in order according to data values for the first data field in the respective tuples. Referring again to FIG. 4C, the data marks within the first subpane 440-1 are ordered according to SUM(price) for Ship Mode within Customer Segment and Prod Type1. The data marks within the second pane 440-2 are ordered according to SUM(price) within the second pane. The nested sort operation independently determines the sort order for each pane.

In some implementations, the method 800 further includes selecting (846) a graph type for the second data visualization according to data types of the first, second, third, and fourth data fields. In some instances, the graph type differs from a graph type selected for the first data visualization.

Figure 8A:
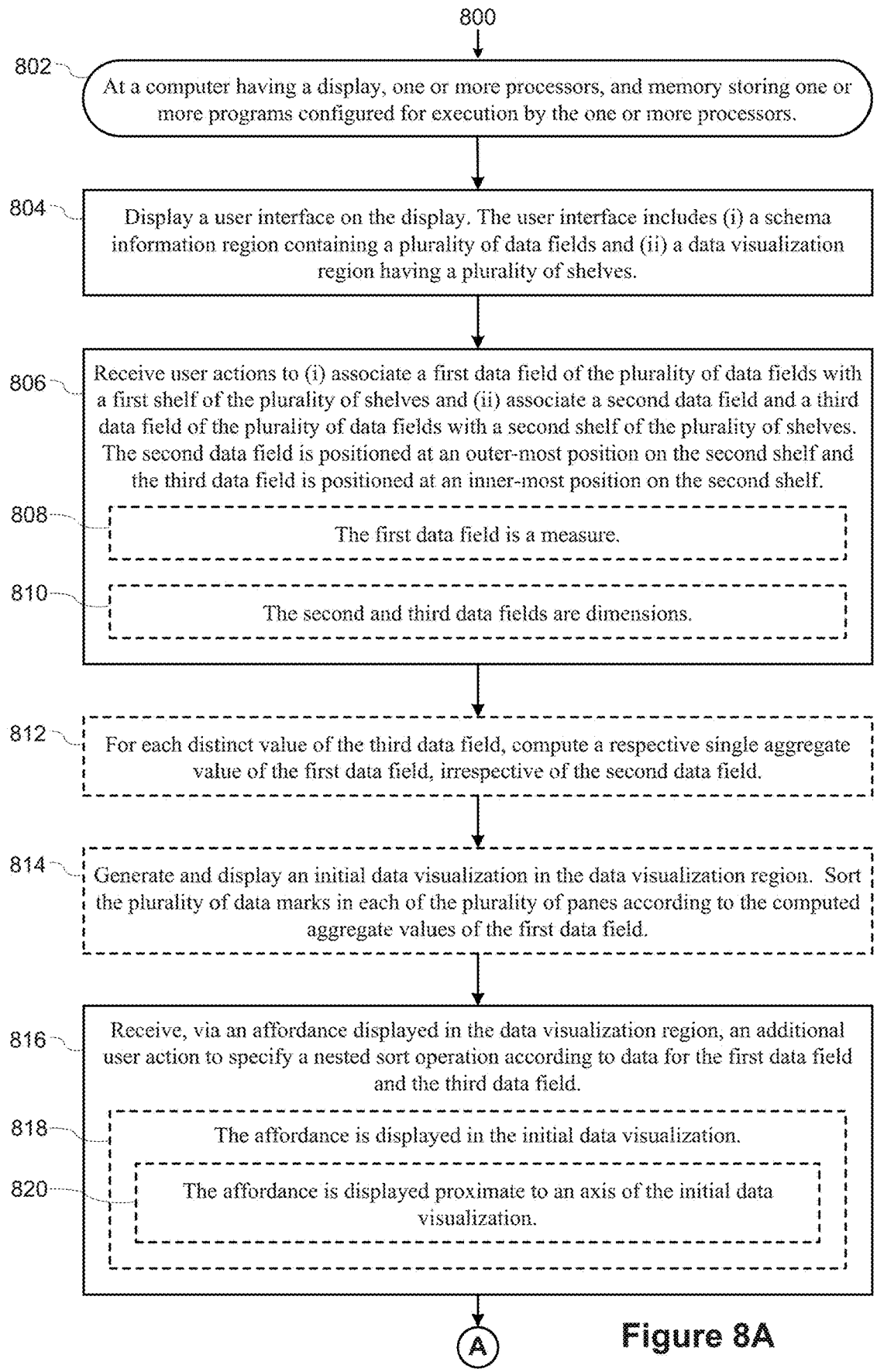
FIGS. 8A-8D provide a flowchart of a process for performing nested sort operations in accordance with some implementations.
Figure 8B:
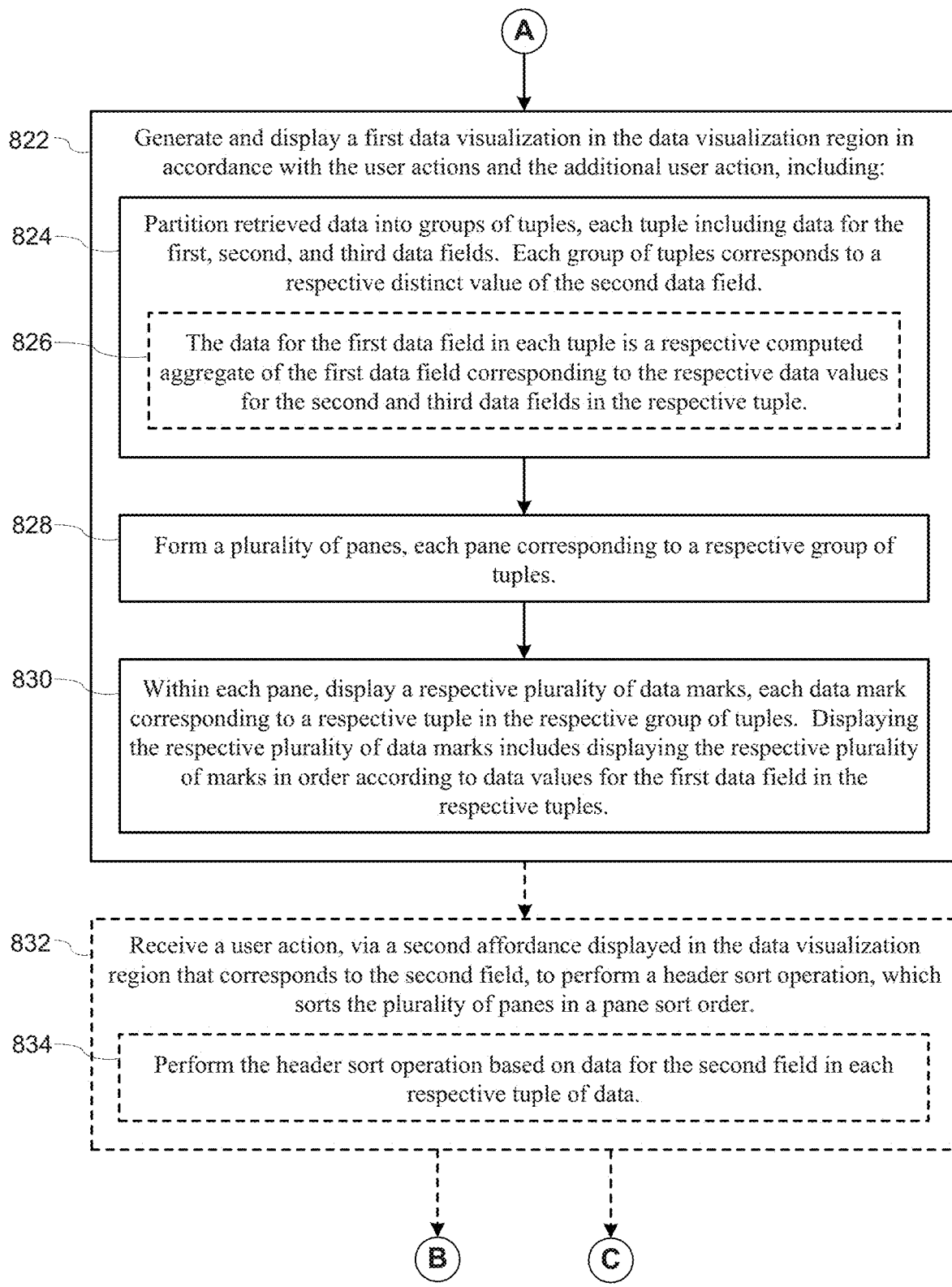
Figure 8C:
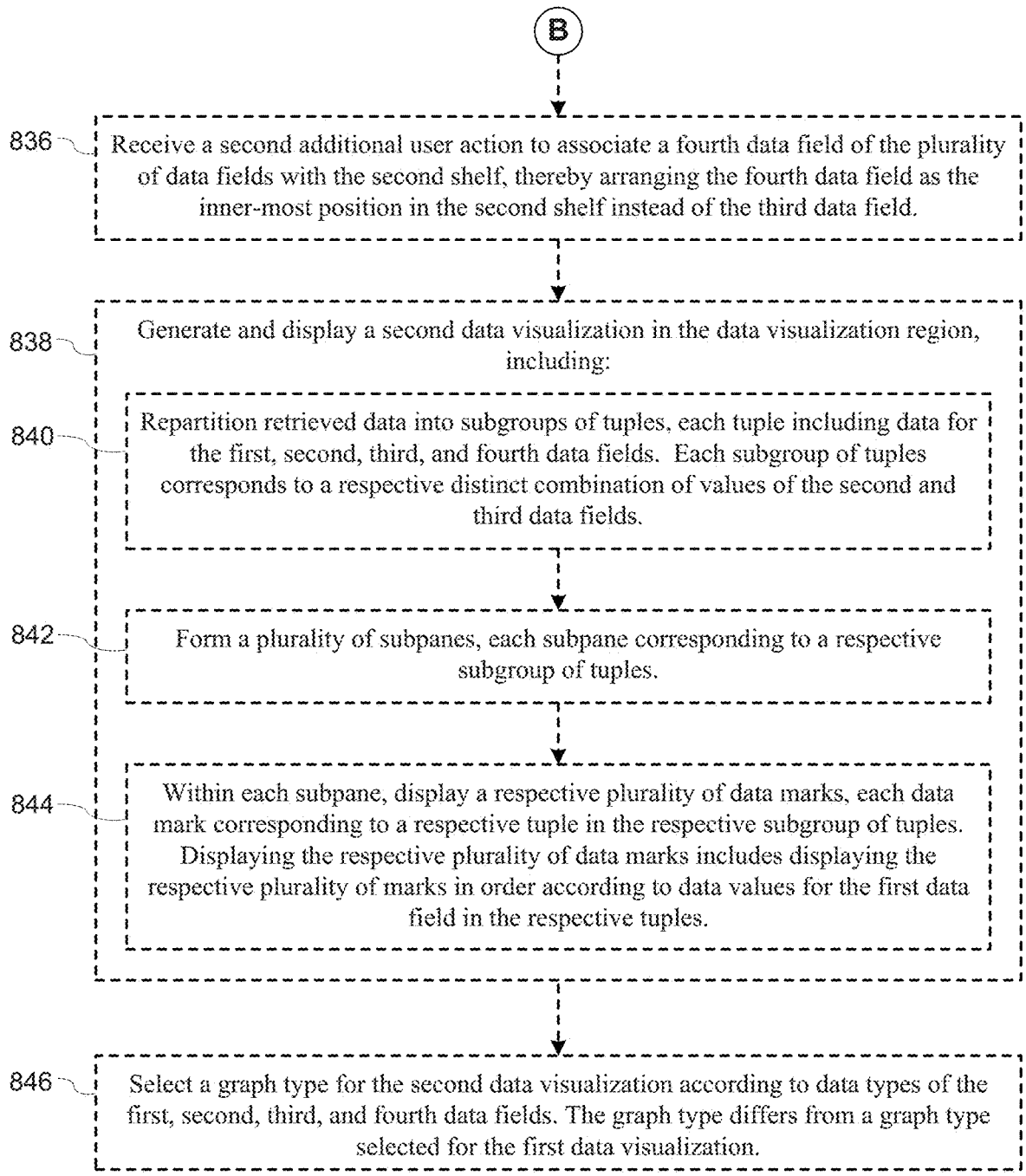
Figure 8D:
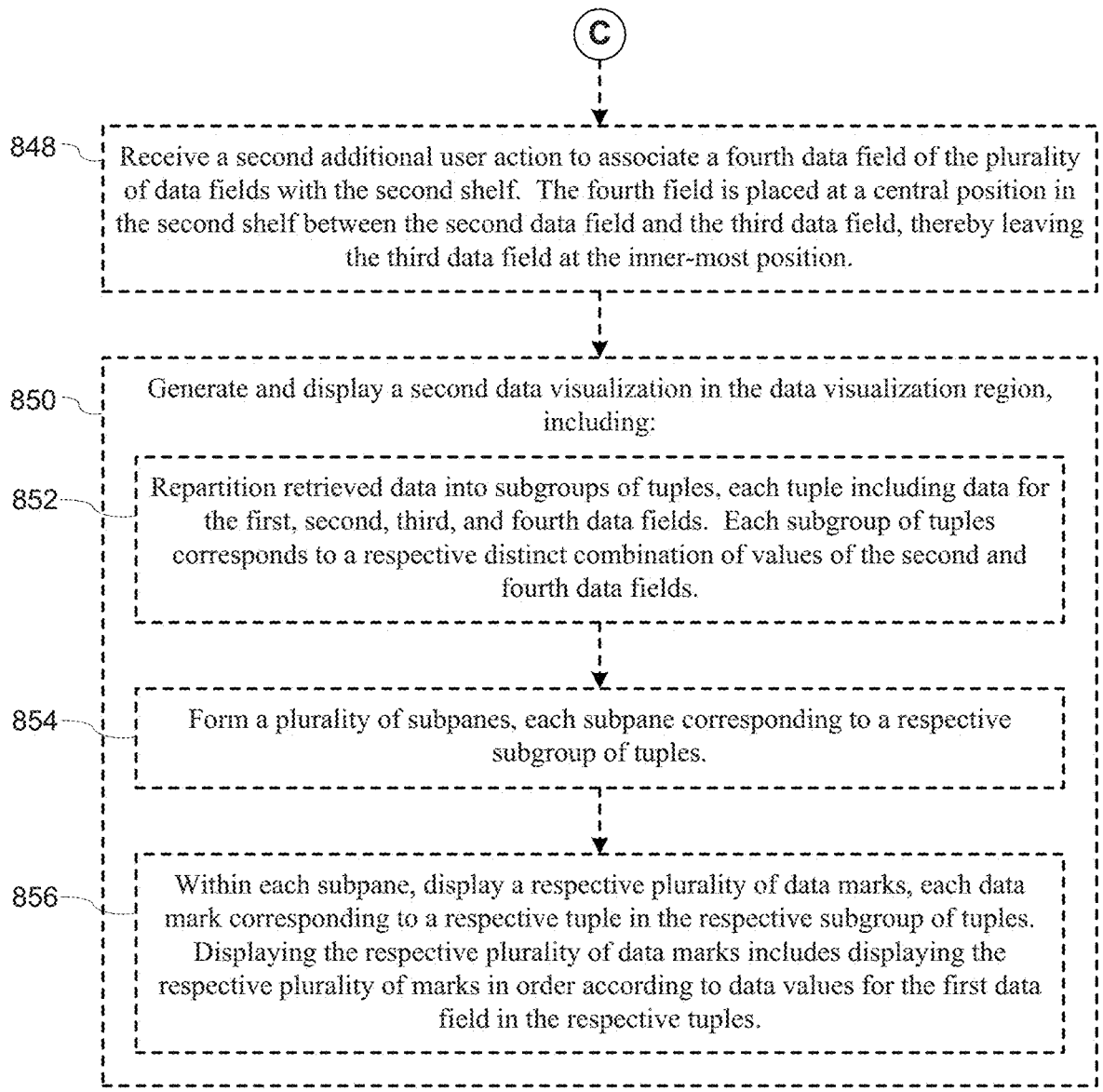

In some implementations, the method 800 further includes receiving (848) a second additional user action to associate a fourth data field of the plurality of data fields with the second shelf. The fourth field is placed (848) at a central position in the second shelf between the second data field and the third data field, thereby leaving the third data field at the inner-most position. This situation is described above with reference to FIGS. 4C and 4E. FIG. 4C includes four data fields on the rows shelf and FIG. 4E includes five data fields on the rows shelf. The concepts described in the flow diagram in FIG. 8D are illustrated by the transition from FIG. 4C to FIG. 4E.

In some implementations, the method 800 further includes generating and displaying (850) a second data visualization in the data visualization region. Generating and displaying the second data visualization includes repartitioning (852) retrieved data into subgroups of tuples, each tuple including data for the first, second, third, and fourth data fields, each subgroup of tuples corresponding to a respective distinct combination of values of the second and fourth data fields.

Displaying and generating the second data visualization further includes forming (854) a plurality of subpanes, each subpane corresponding to a respective subgroup of tuples.

Displaying and generating the second data visualization further includes, within each subpane, displaying (856) a respective plurality of data marks, each data mark corresponding to a respective tuple in the respective subgroup of tuples. Displaying the respective plurality of data marks includes displaying the respective plurality of marks in order according to data values for the first data field in the respective tuples.

In some implementations, the method 800 further includes selecting a graph type for the second data visualization according to data types of the first, second, third, and fourth data fields. The graph type may differ from the graph type selected for the first data visualization.

In some implementations, the sorting information for a data field is saved in a SortInfo object. The properties of a SortInfo object include:

Sort type, which is Natural (data source), alphabetic, computed, or manual. A nested sort has a "computed" sort type because the sort order must be computed using the dimensions that a particular dimension is nested within.

Sort direction, which is ascending or descending.

Measure to sort on, which specifies what measure is used for sorting the data field.

A nested sorting flag, which indicates whether the field sorts in a nested manner within the partitions created by previous dimensions.

Filters, which specifies the filters that should be applied to incoming data before computing the sort order In some implementations, a SortInfo object is attached to a field. The SortInfo object is not attached to a specific pill on one of the shelves, is not associated with a related measure, and is not directly associated with a shelf.

In some implementations, a SortInfo object is included in the visual specification 236.

Implementations provides various means for sorting within a data visualization, which may be accessed or controlled from a variety of locations. The locations include (i) the Sort Dialog (accessible from pill menus), (ii) sort buttons on the main toolbar, (iii) sort buttons on the ubertip that appears when a user clicks on axis headers, and (iv) the axis sort icon (which appears on headers and measure axes). Note that this list is not exhaustive, and implementations typically include several or all of these sorting tools.

Some implementations also provide for shelf sorts, which is stored in association with a specific shelf. For this, some implementations include a ShelfSortInfo class, which describes the sort to apply to a subset of the pills on a shelf. In some implementations, this class includes the following properties: (i) the dimensions on the shelf to sort; (ii) the sort direction; and (iii) the measure to sort by.

Although the techniques of nested sorting have been illustrated in the figures with respect to ordinary bar graphs, nested sorting can be applied more broadly to other types of data visualizations. For example, nested sorting can be applied to a table with multiple dimension columns (e.g., displaying data as character string and numbers rather than bars). Nested sorting can also be used to define the stacking order of stacked bars in a stacked bar chart. More generally, the disclosed techniques of nested sorting can be used to sort data marks within panes independently of data marks in other panes.

As illustrated in some of the examples above, once a nested sort has been applied, the nested sort is typically retained until the user explicitly removes the nested sort or takes an action that makes it impossible to retain the nested sort (e.g., clearing out all of the data fields on the columns and rows shelves or selecting a different data source). As illustrated in FIGS. 4D and 4E, when a new dimension is added (e.g., to the rows shelf), the nested sort is retained. If the new dimension is added at the innermost position, then the nested sort is applied to the newly added dimension. If the new dimension that is added is not at the innermost position, the nested sort remains with the dimension that is still at the innermost position. Note, however, that there will be one more level of panes, so the sorting within the new panes has to be recomputed.

If a dimension is removed, the effect depends on which dimension is removed, and what is remaining. First, if there are no remaining dimensions on the rows and columns shelves, the nested sort no longer applies. If the data field removed is not the innermost data field, then the nested sort is retained by the innermost dimension. If the innermost dimension is removed, the nested sorting is transferred to the dimension on the same shelf that becomes the innermost dimension.

In case the innermost dimension pill is edited, the result depends on the edit. If the edit just switches the innermost dimension to a different innermost dimension, then the nested sort is retained by the "new" dimension. On the other hand, if the edit changes the innermost dimension pill to specify a measure instead, the nested sort is discarded. In some implementations, if the edit converts the pill to a calculated dimension (e.g., concatenation of two dimension fields), the nested sort is retained. In some implementations, nested sorts are now allowed when the innermost data field is calculated.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms first, second, etc. are, in some instances, used herein to describe various elements, these elements should not be limited by these terms. These terms are used only to distinguish one element from another. For example, a first pane could be termed a second pane, and, similarly, a second pane could be termed a first pane, without departing from the scope of the various described implementations. The first pane and the second pane are both panes, but they are not the same pane.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method comprising:
   at a computer having a display, one or more processors, and memory storing one or more programs configured for execution by the one or more processors:
      displaying a user interface on the display, wherein the user interface comprises (i) a schema information region containing a plurality of data fields and (ii) a data visualization region having a plurality of shelves;
      receiving user actions to (i) associate a first data field of the plurality of data fields with a first shelf of the plurality of shelves and (ii) associate a second data field and a third data field of the plurality of data fields with a second shelf of the plurality of shelves, wherein the first data field is a measure, the third data field is a dimension, the second data field is positioned at an outer-most position on the second shelf, and the third data field is positioned at an inner-most position on the second shelf;
      receiving, via an affordance displayed in the data visualization region, an additional user action to specify a nested sort operation according to data for the first data field and the third data field;
      in response to the additional user action, generating and displaying a first data visualization in the data visualization region in accordance with the user actions and the additional user action, including:
         partitioning retrieved data into groups of tuples, each tuple including data for the first, second, and third data fields, wherein each group of tuples corresponds to a respective distinct value of the second data field;
         forming a plurality of panes, each pane corresponding to a respective group of tuples; and
         within each pane, displaying a respective plurality of data marks, each data mark corresponding to a respective tuple in the respective group of tuples, wherein displaying the respective plurality of data marks comprises displaying the respective plurality of data marks in order according to data values for the first data field in the respective tuples;
      wherein the data for the first data field in each tuple is a respective computed aggregate of the first data field corresponding to respective data values for the second and third data fields in the respective tuple.

2. The method of claim 1, further comprising, at the computer:
   receiving a second additional user action to associate a fourth data field of the plurality of data fields with the second shelf, thereby arranging the fourth data field at the inner-most position in the second shelf instead of the third data field; and
   in response to receiving the second additional user action, generating and displaying a second data visualization in the data visualization region, including:
      repartitioning retrieved data into subgroups of tuples, each tuple including data for the first, second, third, and fourth data fields, wherein each subgroup of tuples corresponds to a respective distinct combination of values of the second and third data fields;
      forming a plurality of subpanes, each subpane corresponding to a respective subgroup of tuples; and
      within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

3. The method of claim 2, further comprising, at the computer:
   selecting a first graph type for the first data visualization according to the data types of the first, second, and third data fields; and
   selecting a second graph type for the second data visualization according to data types of the first, second, third, and fourth data fields, wherein the second graph type is different from the first graph type.

4. The method of claim 1, further comprising, at the computer:
   receiving a second additional user action to associate a fourth data field of the plurality of data fields with the second shelf, wherein the fourth field is placed at a central position on the second shelf between the second data field and the third data field, thereby leaving the third data field at the inner-most position; and
   in response to receiving the second additional user action, generating and displaying a second data visualization in the data visualization region, including:
      repartitioning retrieved data into subgroups of tuples, each tuple including data for the first, second, third, and fourth data fields, wherein each subgroup of tuples corresponds to a respective distinct combination of values of the second and fourth data fields;
      forming a plurality of subpanes, each subpane corresponding to a respective subgroup of tuples; and
      within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

5. The method of claim 1, further comprising before receiving the additional user action to perform the nested sort operation:

for each distinct value of the third data field, computing a respective single aggregate value of the first data field, irrespective of the second data field; and generating and displaying an initial data visualization in the data visualization region, including sorting the plurality of data marks in each of the plurality of panes according to the computed aggregate values of the first data field.

6. The method of claim 5, wherein the affordance displayed in the data visualization region is displayed in the initial data visualization.

7. The method of claim 6, wherein the affordance is displayed proximate to an axis of the initial data visualization.

8. The method of claim 1, further comprising:
receiving a second additional user action, via a second affordance displayed in the data visualization region that corresponds to the second field, to perform a header sort operation that sorts the plurality of panes in a pane sort order; and
performing the header sort operation based on data for the second field in each respective tuple of data.

9. A computer system for sorting data marks in a data visualization, comprising:
one or more processors;
memory; and
one or more programs stored in the memory and configured for execution by the one or more processors, the one or more programs comprising instructions for:
displaying a user interface on the display, wherein the user interface comprises (i) a schema information region containing a plurality of data fields and (ii) a data visualization region having a plurality of shelves;
receiving user actions to (i) associate a first data field of the plurality of data fields with a first shelf of the plurality of shelves and (ii) associate a second data field and a third data field of the plurality of data fields with a second shelf of the plurality of shelves, wherein the first data field is a measure, the third data field is a dimension, the second data field is positioned at an outer-most position on the second shelf, and the third data field is positioned at an inner-most position on the second shelf;
receiving, via an affordance displayed in the data visualization region, an additional user action to specify a nested sort operation according to data for the first data field and the third data field;
in response to the additional user action, generating and displaying a first data visualization in the data visualization region in accordance with the user actions and the additional user action, including:
partitioning retrieved data into groups of tuples, each tuple including data for the first, second, and third data fields, wherein each group of tuples corresponds to a respective distinct value of the second data field;
forming a plurality of panes, each pane corresponding to a respective group of tuples; and
within each pane, displaying a respective plurality of data marks, each data mark corresponding to a respective tuple in the respective group of tuples, wherein displaying the respective plurality of data marks comprises displaying the respective plurality of data marks in order according to data values for the first data field in the respective tuples;
wherein the data for the first data field in each tuple is a respective computed aggregate of the first data field corresponding to respective data values for the second and third data fields in the respective tuple.

10. The computer system of claim 9, wherein the one or more programs further comprise instructions for:
receiving a second additional user action to associate a fourth data field of the plurality of data fields with the second shelf, thereby arranging the fourth data field at the inner-most position in the second shelf instead of the third data field; and
in response to receiving the second additional user action, generating and displaying a second data visualization in the data visualization region, including:
repartitioning retrieved data into subgroups of tuples, each tuple including data for the first, second, third, and fourth data fields, wherein each subgroup of tuples corresponds to a respective distinct combination of values of the second and third data fields;
forming a plurality of subpanes, each subpane corresponding to a respective subgroup of tuples; and
within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

11. The computer system of claim 10, wherein the one or more programs further comprise instructions for:
selecting a first graph type for the first data visualization according to the data types of the first, second, and third data fields; and
selecting a second graph type for the second data visualization according to data types of the first, second, third, and fourth data fields, wherein the second graph type is different from the first graph type.

12. The computer system of claim 9, wherein the one or more programs further comprise instructions for:
receiving a second additional user action to associate a fourth data field of the plurality of data fields with the second shelf, wherein the fourth field is placed at a central position on the second shelf between the second data field and the third data field, thereby leaving the third data field at the inner-most position; and
in response to receiving the second additional user action, generating and displaying a second data visualization in the data visualization region, including:
repartitioning retrieved data into subgroups of tuples, each tuple including data for the first, second, third, and fourth data fields, wherein each subgroup of tuples corresponds to a respective distinct combination of values of the second and fourth data fields;
forming a plurality of subpanes, each subpane corresponding to a respective subgroup of tuples; and
within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

13. The computer system of claim 9, wherein the one or more programs further comprise instructions configured to execute before receiving the additional user action to perform the nested sort operation, for:

for each distinct value of the third data field, computing a respective single aggregate value of the first data field, irrespective of the second data field; and generating and displaying an initial data visualization in the data visualization region, including sorting the plurality of data marks in each of the plurality of panes according to the computed aggregate values of the first data field.

14. The computer system of claim 13, wherein the affordance displayed in the data visualization region is displayed in the initial data visualization.

15. The computer system of claim 14, wherein the affordance is displayed proximate to an axis of the initial data visualization.

16. The computer system of claim 9, wherein the one or more programs further comprise instructions for receiving a second additional user action to perform a header sort operation that sorts the plurality of panes in a pane sort order;
the second additional user action is received via a second affordance displayed in the data visualization region that corresponds to the second field; and
the header sort operation is performed based at least in part on data for the second field in each respective tuple of data.

17. A non-transitory computer readable storage medium storing one or more programs configured for execution by a computer system having one or more processors, memory, and a display, the one or more programs comprising instructions for:
displaying a user interface on the display, wherein the user interface comprises (i) a schema information region containing a plurality of data fields and (ii) a data visualization region having a plurality of shelves;
receiving user actions to (i) associate a first data field of the plurality of data fields with a first shelf of the plurality of shelves and (ii) associate a second data field and a third data field of the plurality of data fields with a second shelf of the plurality of shelves, wherein the first data field is a measure, the third data field is a dimension, the second data field is positioned at an outer-most position on the second shelf, and the third data field is positioned at an inner-most position on the second shelf;
receiving, via an affordance displayed in the data visualization region, an additional user action to specify a nested sort operation according to data for the first data field and the third data field;
in response to the additional user action, generating and displaying a first data visualization in the data visualization region in accordance with the user actions and the additional user action, including:
partitioning retrieved data into groups of tuples, each tuple including data for the first, second, and third data fields, wherein each group of tuples corresponds to a respective distinct value of the second data field;
forming a plurality of panes, each pane corresponding to a respective group of tuples; and
within each pane, displaying a respective plurality of data marks, each data mark corresponding to a respective tuple in the respective group of tuples, wherein displaying the respective plurality of data marks comprises displaying the respective plurality of data marks in order according to data values for the first data field in the respective tuples;
wherein the data for the first data field in each tuple is a respective computed aggregate of the first data field corresponding to respective data values for the second and third data fields in the respective tuple.

18. The non-transitory computer readable storage medium of claim 17, wherein the one or more programs further comprise instructions for:
receiving a second additional user action to associate a fourth data field of the plurality of data fields with the second shelf, thereby arranging the fourth data field at the inner-most position in the second shelf instead of the third data field; and
in response to receiving the second additional user action, generating and displaying a second data visualization in the data visualization region, including:
repartitioning retrieved data into subgroups of tuples, each tuple including data for the first, second, third, and fourth data fields, wherein each subgroup of tuples corresponds to a respective distinct combination of values of the second and third data fields;
forming a plurality of subpanes, each subpane corresponding to a respective subgroup of tuples; and
within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

19. The non-transitory computer readable storage medium of claim 18, wherein the one or more programs further comprise instructions for:
selecting a first graph type for the first data visualization according to the data types of the first, second, and third data fields; and
selecting a second graph type for the second data visualization according to data types of the first, second, third, and fourth data fields, wherein the second graph type is different from the first graph type.

20. The non-transitory computer readable storage medium of claim 18, wherein the one or more programs further comprise instructions for:
receiving a second additional user action to associate a fourth data field of the plurality of data fields with the second shelf, wherein the fourth field is placed at a central position on the second shelf between the second data field and the third data field, thereby leaving the third data field at the inner-most position; and
in response to receiving the second additional user action, generating and displaying a second data visualization in the data visualization region, including:
repartitioning retrieved data into subgroups of tuples, each tuple including data for the first, second, third, and fourth data fields, wherein each subgroup of tuples corresponds to a respective distinct combination of values of the second and fourth data fields;
forming a plurality of subpanes, each subpane corresponding to a respective subgroup of tuples; and
within each subpane, displaying a respective plurality of data marks, each data mark corresponding to a respective tuple in the respective subgroup of tuples, wherein displaying the respective plurality of data marks comprises displaying the respective plurality of data marks in order according to data values for the first data field in the respective tuples.

* * * * *